(12) United States Patent
Hur et al.

(10) Patent No.: US 11,455,667 B2
(45) Date of Patent: Sep. 27, 2022

(54) COST CALCULATING SYSTEM AND METHOD THEREFOR

(71) Applicant: SAMSUNG ELECTRONICS CO., LTD., Suwon-si (KR)

(72) Inventors: Won-jin Hur, Seoul (KR); Seon-jae Kim, Seongnam-si (KR); Seong-il Kim, Suwon-si (KR); Jun-seong Park, Seoul (KR); Min-woo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/635,696

(22) PCT Filed: Aug. 8, 2018

(86) PCT No.: PCT/KR2018/009019
§ 371 (c)(1),
(2) Date: Jan. 31, 2020

(87) PCT Pub. No.: WO2019/035594
PCT Pub. Date: Feb. 21, 2019

(65) Prior Publication Data
US 2021/0125243 A1  Apr. 29, 2021

(30) Foreign Application Priority Data
Aug. 14, 2017 (KR) .................. 10-2017-0103207

(51) Int. Cl.
*G06Q 30/04* (2012.01)
*G06Q 30/02* (2012.01)
(Continued)

(52) U.S. Cl.
CPC ......... *G06Q 30/04* (2013.01); *G06Q 30/0283* (2013.01); *G06Q 40/02* (2013.01);
(Continued)

(58) Field of Classification Search
CPC ...... G06Q 20/405; G06Q 50/01; G06Q 30/02; G06Q 30/04; G06Q 40/02; G06Q 20/3223;
(Continued)

(56) References Cited

U.S. PATENT DOCUMENTS 7,461,010 B2 * 12/2008 Kwan .................. G06Q 20/385
705/16
8,380,578 B2 * 2/2013 Ko ..................... G06Q 30/0639
705/26.1
(Continued)

FOREIGN PATENT DOCUMENTS

JP       2002-288584      10/2002
KR   10-2005-0015727       2/2005
(Continued)

OTHER PUBLICATIONS

International Search Report dated Nov. 27, 2018 for PCT/KR2018/009019 and English-language translation.
(Continued)

*Primary Examiner* — Andrew Joseph Rudy
(74) *Attorney, Agent, or Firm* — Nixon & Vanderhye, P.C.

(57) ABSTRACT

An electronic device is provided. The electronic device includes a communicator; a memory storing one or more instructions; and a processor electrically connected to the communicator and the memory, wherein the processor executes the one or more instructions to group a plurality of electronic devices into one group, control the communicator to receive cost information from at least one electronic device included in the group, sum the received cost information, distribute the summed cost information based on a number of the plurality of electronic devices, and control the
(Continued)

communicator to transmit the distributed cost information to the plurality of electronic devices.

13 Claims, 27 Drawing Sheets

(51) Int. Cl.
| | |
|---|---|
| *G06Q 40/02* | (2012.01) |
| *G06Q 50/00* | (2012.01) |
| *H04W 4/12* | (2009.01) |
| *G06Q 20/36* | (2012.01) |
| *H04W 4/08* | (2009.01) |

(52) U.S. Cl.
CPC ......... *G06Q 50/01* (2013.01); *G06Q 20/3672* (2013.01); *H04W 4/08* (2013.01); *H04W 4/12* (2013.01)

(58) Field of Classification Search
CPC ........... G06Q 30/0283; G06Q 20/3672; G06Q 20/384; G06Q 20/3267; G06Q 50/00; H04W 4/08; H04W 4/12
USPC ........................................................... 705/34
See application file for complete search history.

(56) References Cited

U.S. PATENT DOCUMENTS

| | | | | |
|---|---|---|---|---|
| 8,638,694 B2* | 1/2014 | Tanaka | ..................... | H04L 45/20 |
| | | | | 370/255 |
| 8,761,017 B2* | 6/2014 | Pechanec | ............ | H04L 12/5692 |
| | | | | 370/235 |
| 9,602,390 B2* | 3/2017 | Yamada | ................ | H04L 45/124 |
| 11,010,747 B2* | 5/2021 | Jones | ................... | G06Q 20/227 |
| 11,010,757 B2* | 5/2021 | Nadella | ................ | G06Q 20/227 |
| 11,200,573 B2* | 12/2021 | Groarke | ................. | G06Q 30/06 |
| 2012/0053985 A1* | 3/2012 | Tillman | ............. | G06Q 30/0201 |
| | | | | 705/7.29 |
| 2021/0125243 A1* | 4/2021 | Hur | ....................... | G06Q 20/405 |

FOREIGN PATENT DOCUMENTS

| | | |
|---|---|---|
| KR | 10-2014-0065700 | 5/2014 |
| KR | 10-2014-0105364 | 9/2014 |
| KR | 10-2015-0103856 | 9/2015 |
| KR | 10-1692158 | 12/2016 |
| KR | 10-1758712 | 7/2017 |
| WO | WO 01/24551 A1 * 9/1999 ............. G06Q 30/02 |

OTHER PUBLICATIONS

Written Opinion dated Nov. 27, 2018 for PCT/KR2018/009019 and English-language translation.
International Search Report for PCT/KR2018/009019 dated Nov. 27, 2018, 4 pages.
Written Opinion of the ISA for PCT/KR2018/009019 dated Nov. 27, 2018, 6 pages.
Checkpay "Billing and Payment FinTech service for you" dated Apr. 20, 2017 and English-language translation.
Checkpay—Zero Pay and Mobile Vouchers on the App Store—https://itunes.apple.com/kr/app/%EC%B2%B4%ED%81%AC%ED%8E%98%EC%9D%B4-%EB%8B%B9%EC%8B%A0%EC%9D%84-%EC%9C%84%ED%95%9C-%EC%B2%AD%EA%B5%AC%EC%88%98%EB%82%A9-%ED%95%80%ED%85%8C%ED%81%AC%EC%84%9C%EB%B9%84%EC%8A%A4/id1083261085?mt=8.
CheckPAY—Easy Zero pay payment in check PAY app—https://app.checkpay.co.kr/.
Notice of Non-Final Rejection dated Mar. 31, 2022 in counterpart Korean Patent Application No. 10-2017-0103207 and English-language translation.

* cited by examiner

FIG. 6B

< ADD

FEE  DUTCH PAY

ⓘ CHICKEN & BEER

₩ 60,000 — 611
— 613

👤 3   ÷ % ⋮

Me  KIMJIYOUNG
     ME              20,000 WON

N   KIMJIHOON
    N PANG MEMBER   20,000 WON    — 615

✉   GOHEUNSOO
    010-1234-5678   20,000 WON

+ ADD

REGISTER

600

COST CALCULATING SYSTEM AND METHOD THEREFOR

This application is the U.S. national phase of International Application No. PCT/KR2018/009019 filed Aug. 8, 2018 which designated the U.S. and claims priority to KR Patent Application No. 10-2017-0103207 filed Aug. 14, 2017, the entire contents of each of which are hereby incorporated by reference.

TECHNICAL FIELD

The disclosure relates to a method of collecting and calculating a cost used by a plurality of users in a server or an electronic device.

BACKGROUND ART

Recently, according to the development of semiconductor technology and communication technology, a user may collect information about a cost used by a plurality of users by using a social network service (SNS) and share the information with other users through the SNS.

SUMMARY

A cost calculating method using a social network service (SNS) has a cumbersome and complicated calculating procedure since, when a plurality of users pay a cost, a representative user (hereinafter referred to as a "general manager") shares cost details from the plurality of users and then, inputs the cost details into an electronic device of the user, sums and calculates the cost details for each item, and shares the cost details with the plurality of users again, and the plurality of users have to remit the cost to a relevant account.

Provided are systems and methods for automatically calculating a cost in which, when a plurality of users pay the cost, a representative user generates a plurality of users to share the cost as a group in an electronic device and transmits information about the group to the plurality of users, and the plurality of users input cost details using their electronic devices.

BRIEF DESCRIPTION OF THE DRAWINGS

FIGS. 6A, 6B, 6C, 6D, 6E, 6F, and 6G show examples of inputting cost information used by an electronic device;

DETAILED DESCRIPTION OF EXAMPLE EMBODIMENTS

Figure 1:
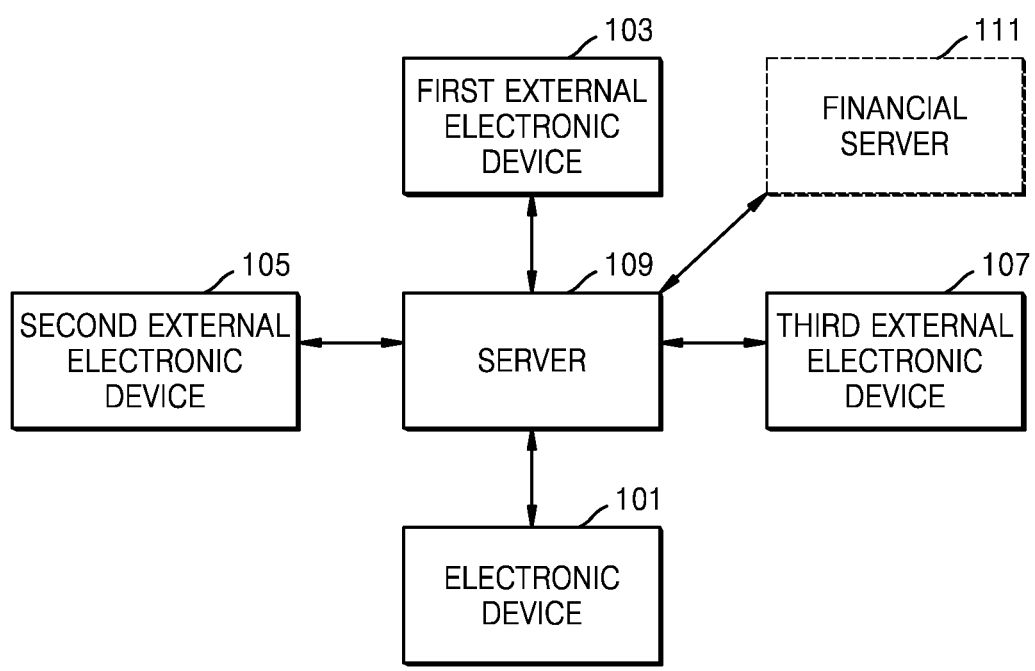
FIG. 1 shows a system configuration according to an embodiment.

In accordance with an aspect of the disclosure, a cost calculating method includes grouping a plurality of electronic devices into one group; receiving cost information from at least one electronic device included in the group; summing the received cost information; distributing the summed cost information, based on a number of the plurality of electronic devices; and transmitting the distributed cost information to the plurality of electronic devices.

The cost calculating method may further include receiving a list of members to share a cost from the at least one electronic device included in the group; and distributing the cost information based on the list of members.

The plurality of electronic devices included in the group may be determined based on a member list received from any one of the plurality of electronic devices.

The cost calculating method may further include: receiving financial account information from a user; and receiving transaction history information about a financial account from a financial server based on the financial account information.

In accordance with another aspect of the disclosure, a cost calculating method includes generating a group with respect to a plurality of electronic devices; receiving a user input; selecting a plurality of electronic devices to be included in the group, based on the user input; transmitting information about the group to the selected plurality of electronic devices; receiving cost information from at least one electronic device included in the group; summing the received cost information; distributing the summed cost information based on a number of the plurality of electronic devices included in the group; and transmitting the distributed cost information to the plurality of electronic devices included in the group.

The user input may receive a plurality of contacts from a contact list stored in the plurality of electronic devices.

The cost calculating method may further include receiving the cost information based on an image captured through a camera.

The cost calculating method may further include receiving the cost information based on a text message received by the plurality of electronic devices.

The cost calculating method may further include displaying a first item and a second item on a display, wherein the first item includes a first cost and a first member list to share the first cost and the second item includes a second cost and a second member list to share the second cost.

In accordance with another aspect of the disclosure, an electronic device includes a communicator; a memory storing one or more instructions; and a processor electrically connected to the communicator and the memory, wherein the processor executes the one or more instructions to group a plurality of electronic devices into one group, control the communicator to receive cost information from at least one electronic device included in the group, sum the received cost information, distribute the summed cost information based on a number of the plurality of electronic devices, and control the communicator to transmit the distributed cost information to the plurality of electronic devices.

The processor may execute the one or more instructions to receive a list of users of electronic devices to share a cost from at least one electronic device included in the group and distribute the cost information based on the list of users.

The plurality of electronic devices included in the group may be determined based on a user list received from any one of the plurality of electronic devices.

The processor may execute the one or more instructions to receive financial account information from a user and control the communicator to receive transaction history information about a financial account from a financial server, based on the financial account information.

In accordance with another aspect of the disclosure, an electronic device includes a communicator; a memory storing one or more instructions; and a processor electrically connected to the communicator and the memory, wherein the processor executes the one or more instructions to generate a group with respect to a plurality of electronic devices, receive a user input, select a plurality of electronic devices to be included in the group, based on the user input, transmit information about the group to the selected plurality of electronic devices, receive cost information from at least one electronic device included in the group, sum the received cost information, distribute the summed cost information based on a number of the plurality of electronic devices included in the group, and control the communicator to transmit the distributed cost information to the plurality of electronic devices included in the group.

The user input may receive a plurality of contacts from a contact list stored in the plurality of electronic devices.

The electronic device may further include a camera, wherein the processor executes the one or more instructions stored to receive the cost information based on an image captured through the camera.

The processor may execute the one or more instructions to receive the cost information based on a text message received by the plurality of electronic devices.

The electronic device may further include a display, wherein the processor executes the one or more instructions to control the display to display a first item and a second item on a display, wherein the first item includes a first cost and a first member list to share the first cost and the second item includes a second cost and a second member list to share the second cost.

The first member list and the second member list may be different from each other.

In accordance with another aspect of the disclosure, a computer program product including a non-transitory computer readable recording medium including instructions to cause an electronic device to perform operations of: generating a group with respect to a plurality of electronic devices; receiving a user input; selecting a plurality of electronic devices to be included in the group, based on the user input; transmitting information about the group to the selected plurality of electronic devices; receiving cost information from at least one electronic device included in the group; summing the received cost information; distributing the summed cost information based on a number of the plurality of electronic devices included in the group; and transmitting the distributed cost information to the plurality of electronic devices included in the group.

In accordance with another aspect of the disclosure, a method includes grouping a plurality of external electronic devices into one group; generating a group virtual wallet corresponding to the group; receiving user information of at least one external electronic device included in the group from the at least one external electronic device; and generating an individual virtual wallet corresponding to a user, based on the received user information.

The group virtual wallet and the individual virtual wallet may include virtual account information.

In accordance with another aspect of the disclosure, an electronic device includes a communicator; a memory storing one or more instructions; and a processor electrically connected to the communicator and the memory, wherein the processor executes the one or more instructions to group a plurality of external electronic devices into one group, generate a group virtual wallet corresponding to the group, receive user information of at least one external electronic device included in the group from the at least one external electronic device, and generate an individual virtual wallet corresponding to a user based on the received user information.

Hereinafter, various embodiments of the present disclosure will be described with reference to the accompanying drawings. It should be understood that the embodiments and terminology used herein are not intended to limit the techniques described in the present disclosure to the specific embodiments, but rather should be understood to include various modifications, equivalents, and/or alternatives of the embodiments. In the description of the drawings, like reference numerals may be used for similar elements. The singular expressions may include plural expressions unless the context clearly dictates otherwise. In the present disclosure, the expressions "A or B" or "at least one of A and/or B" and the like may include all possible combinations of the items listed together. Expressions such as "first," "second," "first," or "second," and the like, may express their components irrespective of order or importance and may be used to distinguish one component from another but is not limited to those components. When it is mentioned that a (e.g., first) component is "(functionally or communicatively) connected" or "connected to" another (e.g., second) component, the component may be connected directly to the other component, or may be connected through another component (e.g., a third component).

In the present disclosure, "configured to" used herein may be interchangeably used with "suitable to" in a hardware or software way, "having the ability to", "changed to", "made to", "able to", or "designed to" according to a situation. In some situations, the expression "a device configured to" may mean that the device may "be able to" with other devices or components. For example, the phrase "a processor configured to perform A, B, and C" may mean a dedicated processor (e.g., an embedded processor) for performing a corresponding operation or a general purpose processor (e.g., a central processing unit (CPU) or an application processor) capable of performing corresponding operations by executing one or more software programs stored in a memory device.

An electronic device in accordance with various embodiments of the present disclosure may include at least one of, for example, a smart phone, a tablet personal computer (PC), a mobile phone, a videophone, an electronic book reader, a desktop PC, a laptop PC, a netbook computer, and a workstation.

A device in accordance with various embodiments of the present disclosure may include at least one of, for example, a television, a digital video disk (DVD) player, an audio, a refrigerator, an air conditioner, a vacuum cleaner, an oven, a microwave oven, a washing machine, an air cleaner, a set top box, a home automation control panel, a security control panel, a media box (e.g. Samsung HomeSync®, Apple TV®, or Google TV®), a game console (e.g., Xbox®, PlayStation®), an electronic dictionary, an electronic key, a camcorder, and an electronic frame.

In the present disclosure, the term user may refer to a person who uses the electronic device or a device (e.g., an artificial intelligence electronic device) using the electronic device.

In the present disclosure, the term 'user input' may be used as a term including, for example, selection of a button (or a key) of a user, pressing (or clicking) of the button (or the key) of the user, a touch of a soft button (or a soft key) of the user, a touch (or a non-contact such as hovering, a user's voice, and a presence (e.g. the user appears within a camera recognition range) of the user) received (or detected) by the user on a touch screen, or a motion of the user. Also, 'selection of the button (or the key) may be used as a term meaning pressing (or clicking) of the button (or the key) or the touch of the soft button (or the soft key).

In the present disclosure, an external electronic device may be used to distinguish it from an electronic device, and may functionally be the same as the electronic device, and may be collectively referred to as the electronic device in some cases.

In the present disclosure, a user interface (UI) may include graphic objects, characters, and icons displayed on a display.

FIG. 1 shows a system configuration according to an embodiment.

Referring to FIG. 1, an electronic device 101, a first external electronic device 103, a second external electronic device 105, a third external electronic device 107, a server 109, and a financial server 111 are illustrated.

The electronic device 101, the first external electronic device 103, the second external electronic device 105, and the third external electronic device 107 may be smartphones.

For example, the electronic device 101 may be a smartphone of a user A, the first external electronic device 103 may be a smartphone of a user B, the second external electronic device 105 may be a smartphone of a user C, and the third external electronic device 107 may be a smartphone of a user D.

The server 109 may provide services according to an embodiment. The server 109 may group, for example, the electronic device 101, the first external electronic device 103, the second external electronic device 105 and the third external electronic device 107 into one group according to a request of the electronic device 101 of the user A and generate the group. Here, generating a group may be interpreted as giving a group name. That is, the server 109 may assign the group name according to a user input or automatically.

The server 109 may receive and sum cost information of purchased goods or services from at least one of the electronic device 101, the first external electronic device 103, the second external electronic device 105, and the third external electronic device 107.

The server 109 may receive a list of members or a list of participants to share cost from at least one of the electronic device 101, the first external electronic device 103, the second external electronic device 105 and the third external electronic device 107 and distribute the summed cost information using the received list of members or list of participants.

The server 109 may also distribute the summed cost information according to the number of electronic devices included in the group.

For example, when the server 109 receives cost information of 100,000 won from the electronic device 101, receives cost information of 200,000 won from the first external electronic device 103, receives the cost information of 300,000 won from the second external electronic device 105, and receives a list of 4 participants from the electronic device 101, the server 109 may determine cost information of 150,000 won obtained by dividing summed cost information of 600,000 won to 4 as distribution cost and transmit distribution cost information to the electronic device 101, the first external electronic device 103, the second external electronic device 105 and the third external electronic device 107.

As another example, when the server 109 receives cost information of 100,000 won and a list of 2 participants (user A and user B) from the electronic device 101 and receives cost information of 200,000 won and a list of 4 participants (users A, B, C, and D) from the first external electronic device 103, the server 109 may transmit distributed cost information of 100,000 won for the user A, 100,000 won for the user B, 50,000 won for the user C, and 50,000 won for the user D to the electronic device 101, the first external electronic device 103, the second external electronic device 105 and the third external electronic device 107 respectively.

The server 109 may be connected to the financial server 111 according to an embodiment. In this case, the server 109 may receive financial information related to the group from the financial server 111. For example, the server 109 may receive transaction history information of a financial account. For example, when a user inputs an account number in the electronic device 101, the account number may be transmitted to the server 109, and the server 109 may request the financial server 111 for transaction details of a financial account corresponding to the account number.

Hereinafter, for convenience of explanation, the electronic device 101 is the user A, the first external electronic device 103 is the user B, the second external electronic device 105 is the user C, and the third external electronic device 107 is the user D.

The cost information may also mean cost spent to purchase and pay a certain product or service. For example, '200,000 won' means the cost information.

Figure 2:
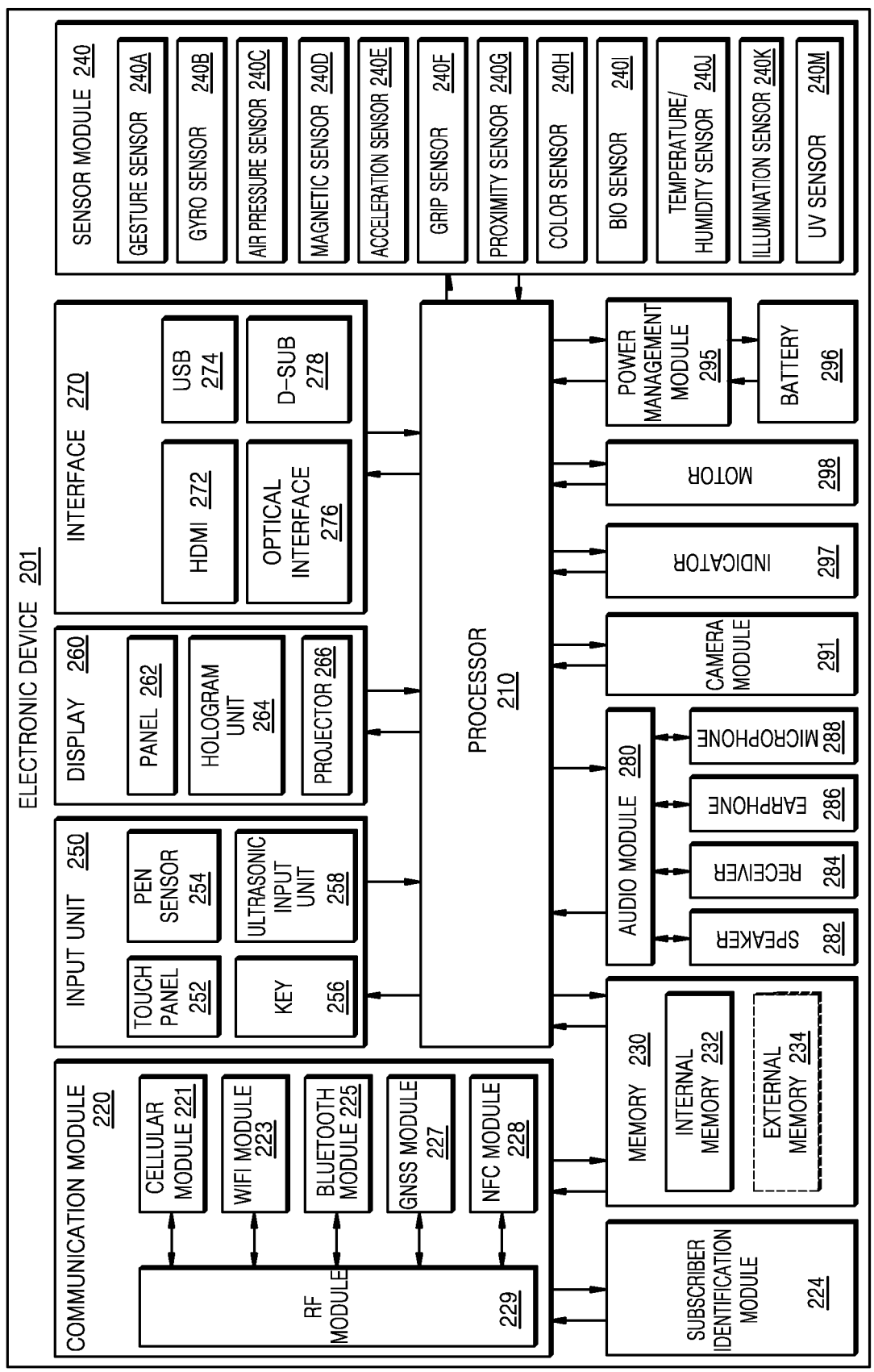
FIG. 2 is a block diagram of an electronic device according to an embodiment.

FIG. 2 is a block diagram of an electronic device 201 according to an embodiment.

The electronic device 201 may include one or more processors (e.g., AP) 210, a communication module 220, a subscriber identification module 224, a memory 230, a sensor module 240, an input unit 250, a display 260, an interface 270, an audio module 280, a camera module 291, a power management module 295, a battery 296, an indicator 297, and a motor 298. The processor 210 may, for example, operate an operating system or an application program to control a number of hardware or software components coupled to the processor 210 and perform various data processing and operations. The processor 210 may be implemented as, for example, a system on chip (SoC). According to an embodiment, the processor 210 may further include a graphics processing unit (GPU) and/or an image signal processor.

The processor 210 may load and process "command or data received from at least one of other components (e.g., non-volatile memory) into volatile memory and store resulting data in the non-volatile memory.

The communication module 220 may include, for example, a cellular module 221, a WiFi module 223, a Bluetooth module 225, a GNSS module 227, an NFC module 228 and an RF module 229. The cellular module 221 may provide, for example, voice calls, video calls, text services, or Internet services over a communication network. According to an embodiment, the cellular module 221 may utilize the subscriber identification module (e.g., a SIM card) 224 to perform identification and authentication of the electronic device 201 within a communication network. According to an embodiment, the cellular module 221 may perform at least some of functions that the processor 210 may provide. According to an embodiment, the cellular module 221 may include a communications processor (CP). According to some embodiments, at least some (e.g., two or more) of the cellular module 221, the WiFi module 223, the Bluetooth module 225, the GNSS module 227, and the NFC module 228 may be included in an integrated chip (IC) or an IC package. The RF module 229 may, for example, send and receive communication signals (e.g., RF signals). The RF module 229 may include, for example, a transceiver, a power amplifier module (PAM), a frequency filter, a low noise amplifier (LNA), or an antenna. According to another embodiment, at least one of the cellular module 221, the WiFi module 223, the Bluetooth module 225, the GNSS module 227, and the NFC module 228 may transmit/receive an RF signal through a separate RF module. The subscriber identification module 224 may include, for example, a card or an embedded SIM including a subscriber identification module and may include unique identification information (e.g., an integrated circuit card identifier (ICCID)) or subscriber information (e.g., international mobile subscriber identity (IMSI)).

The memory 230 (e.g., memory 130) may include, for example, internal memory 232 or external memory 234. The internal memory 232 may include at least one of, for example, volatile memory (e.g., DRAM, SRAM, or SDRAM), non-volatile memory (e.g., one time programmable ROM (OTPROM), PROM, EPROM, EEPROM, mask ROM, flash ROM, flash memory, hard drive, or solid state drive (SSD). The external memory 234 may include flash drive, for example, compact flash (CF), secure digital (SD), Micro-SD, Mini-SD, extreme digital (xD), multimedia card (MMC) or memory stick. The external memory 234 may be functionally or physically connected to the electronic device 201 through various interfaces.

The sensor module 240 may, for example, measure a physical quantity or sense an operating state of the electronic device 201 to convert measured or sensed information into an electrical signal. The sensor module 240 may include at least one of, for example, a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a red, green, blue (RGB) sensor), a bio sensor 240I, a temperature/humidity sensor 240J, an illumination sensor 240K, and a ultra violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors belonging to the sensor module 240. In some embodiments, the electronic device 201 may further include a processor configured to control the sensor module 240, either as part of the processor 210 or separately, to control the sensor module 240 while the processor 210 is in a sleep state.

The input unit 250 may include, for example, a touch panel 252, a (digital) pen sensor 254, a key 256, or an ultrasonic input unit 258. The touch panel 252 may use at least one of, for example, an electrostatic type, a pressure sensitive type, an infrared type, and an ultrasonic type. Further, the touch panel 252 may further include a control circuit. The touch panel 252 may further include a tactile layer to provide a tactile response to the user. The (digital) pen sensor 254 may, for example, be part of the touch panel 252 or may include a separate recognition sheet. The key 256 may include, for example, a physical button, an optical key, or a keypad. The ultrasonic input unit 258 may sense ultrasonic waves generated from an input tool through the microphone (e.g., 288) and confirm data corresponding to the sensed ultrasonic waves.

The display 260 (e.g., the display 160) may include a panel 262, a hologram unit 264, a projector 266, and/or a control circuit for controlling the panel 262, the hologram unit 264, and the projector 266. The panel 262 may be implemented, for example, flexibly, transparently, or wearably. The panel 262 and the touch panel 252 may be configured as one or more modules. According to an embodiment, the panel 262 may include a pressure sensor (or a force sensor) capable of measuring the intensity of pressure on a user's touch. The pressure sensor may be integrated with the touch panel 252 or may be implemented as one or more sensors separately from the touch panel 252. The hologram unit 264 may display a stereoscopic image in the air using the interference of light. The projector 266 may display an image by projecting light onto a screen. The screen may, for example, be located inside or outside of the electronic device 201. The interface 270 may include, for example, an HDMI 272, a USB 274, an optical interface 276, or a D-subminiature (D-sub) 278. The interface 270 may be included, for example, in the communication interface 170 shown in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280 may convert, for example, sound and electrical signals in both directions. At least some components of the audio module 280 may be included, for example, in the input/output interface 145 shown in FIG. 1. The audio module 280 may process sound information input or output through, for example, a speaker 282, a receiver 284, an earphone 286, a microphone 288, or the like. The camera module 291 is a unit capable of, for example, capturing still images and moving images, and according to an embodiment, may include one or more image sensors (e.g., a front sensor or a rear sensor), a lens, an image signal processor (ISP), or flash (e.g., an LED or xenon lamp, etc.). The power management module 295 may manage, for example, power of the electronic device 201. According to an embodiment, the power management module 295 may include a power management integrated circuit (PMIC), a charging IC, or a battery or a fuel gauge. The PMIC may have a wired and/or wireless charging method. The wireless charging method may include, for example, a magnetic resonance method, a magnetic induction method, or an electromagnetic wave method, and may further include an additional circuit for wireless charging, for example, a coil loop, a resonant circuit, or a rectifier. The battery gauge may measure, for example, a remaining amount of the battery 296, voltage, current, or temperature during charging. The battery 296 may include, for example, a rechargeable battery and/or a solar cell.

The indicator 297 may indicate a specific state of the electronic device 201 or a part thereof (e.g., the processor 210), such as a booting state, a message state, or a charging state. The motor 298 may convert an electrical signal to mechanical vibration, and may generate vibration, haptic effects, and the like. The electronic device 201 may include a mobile TV supporter (e.g. a GPU) capable of processing media data conforming to standards such as digital multimedia broadcasting (DMB), digital video broadcasting (DVB), or media flow (medaiFlo™). Each of the components described herein may include one or more components, and a name thereof may be changed according to a type of an electronic device. In various embodiments, the electronic device (e. g., 201) may have some components omitted, further include additional components, or have some of the components combined into one entity and performing functions of the components before combined in the same manner.

Meanwhile, a first external electronic device, a second external electronic device, and a third external electronic device may be configured as the same blocks as the electronic device 201.

Figure 3:
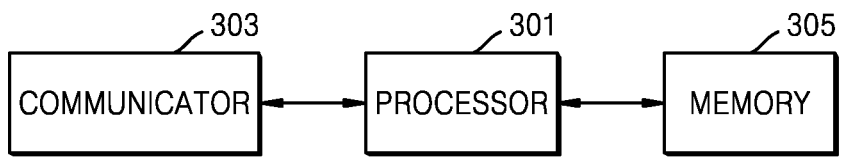
FIG. 3 shows a block diagram of a server according to an embodiment.

FIG. 3 shows a block diagram of the server 109 according to an embodiment. Referring to FIG. 3, the server 109 may include a processor 301, a communicator 303, and memory 305.

The processor 301 may control the communicator 303 to receive cost information from at least one of the electronic device 101, the first external electronic device 103, the second external electronic device 105 and the third external electronic device 107 shown in FIG. 1 and sum and store the received cost information in the memory 305.

The processor 301 may control the communicator 303 to receive a list of participants from at least one of the electronic device 101, the first external electronic device 103, the second external electronic device 105 and the third external electronic device 107, distribute summed cost information and transmit the distributed cost information to all of some of the electronic device 101, the first external electronic device 103, the second external electronic device 105 and the third external electronic device 107 based on the received list of participants.

The list of participants may not match a list of members included in a group. For example, the list of members included in the group may include 'User A', 'User B', 'User C', and 'User D', whereas the list of participants may include only 'User A' and 'User B'.

The communicator 303 may communicate with the electronic device 101, the first external electronic device 103, the second external electronic device 105 and the third external electronic device 107 and receive the cost information or receive information of members to share cost. The communicator 303 may also transmit the cost information to be shared and group information to the electronic device 101, the first external electronic device 103, the second external electronic device 105 and the third external electronic device 107. The group information may include, for example, financial information related to the group.

The memory 305 may store the group information and the summed cost information.

Figure 4A:
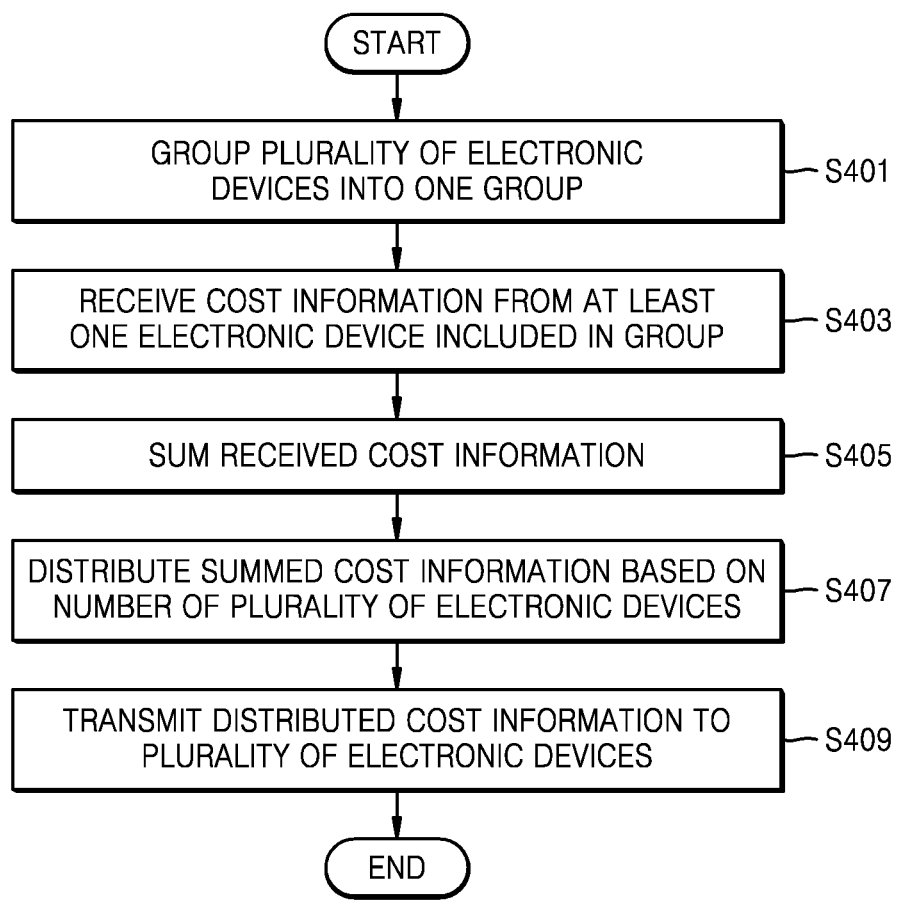
FIG. 4A is a flowchart of a cost calculating method performed by a server, according to an embodiment.

FIG. 4A is a flowchart of a cost calculating method performed by the server 109 according to an embodiment. Referring to FIG. 4A, the server may group a plurality of electronic devices into one group (S401). Here, the plurality of electronic devices may include the electronic device 101, the first external electronic device 103, the second external electronic device 105, and the third external electronic device 107 shown in FIG. 1.

The server 109 may group the plurality of electronic devices into one group at a request of the electronic device 101. For example, when a user executes an application that provides a service according to an embodiment in the electronic device 101, a UI requesting an input of a group name on a display of the electronic device 101 may be displayed. When the user inputs the group name, the electronic device 101 may transmit the group name entered by the user to the server 109, and the server 109 may generate a group corresponding to the group name. The electronic device 101 may generate the group according to an embodiment.

When the user inputs financial information (for example, an account number), the server 109 may receive transaction history information (for example, balance and deposit details) of a financial account corresponding to the account number from the financial server 111 and store the transaction history information in memory of the server 109. The server 109 may transmit the transaction history information of the financial account to the electronic device 101, and the electronic device 101 may display the transaction history information on the display.

The server 109 may receive cost information from at least one electronic device included in the group (S403). For example, as described above with reference to FIG. 1, the server 109 may receive the cost information from at least one of the electronic device 101, the first external electronic device 103, the second external electronic device 105 and the third external electronic device 107.

The server 109 may sum the received cost information (S405).

The server 109 may distribute the summed cost information based on the number of a plurality of external electronic devices (S407). Alternatively, the server 109 may distribute the summed cost information based on a list of participants sent from the electronic device 101.

Alternatively, the server 109 may distribute the summed cost information based on a user input. Specifically, the server 109 may distribute the summed cost information based on a user input received at the electronic device 101. For example, the display of the electronic device 101 may display a UI (e.g., a touch button) capable of selecting a distribution method, and the electronic device 101 may receive a user input to select the distribution method and transmit the user input to the server 109.

The server 109 may transmit the distributed cost information to the plurality of electronic devices (S409). For example, the server 109 may send the distributed cost information to the electronic device 101, the first external electronic device 103, the second external electronic device 105, and the third external electronic device 107.

Figure 4B:
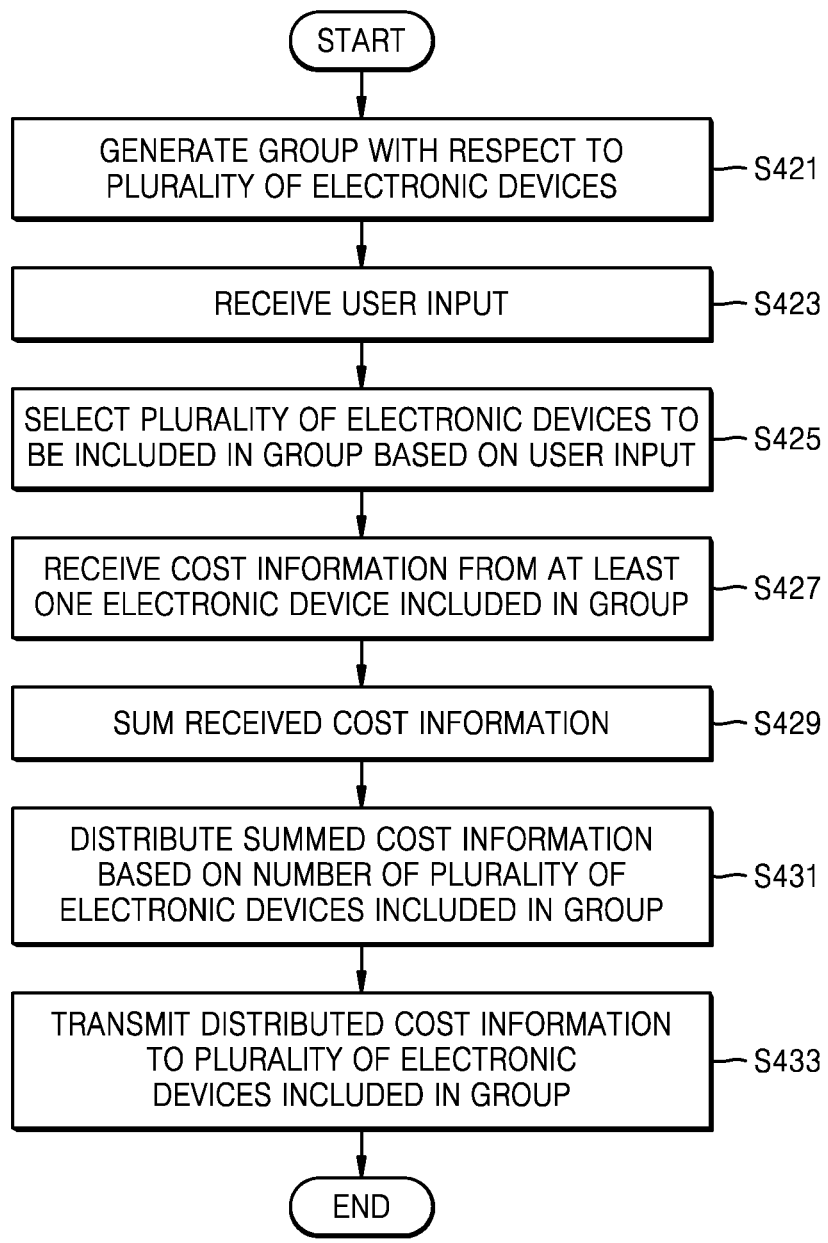
FIG. 4B is a flowchart of a cost calculating method performed by an electronic device, according to an embodiment.

FIG. 4B is a flowchart of a cost calculating method performed by the electronic device 101 according to an embodiment.

Referring to FIG. 4B, the electronic device 101 may generate a group with respect to a plurality of external electronic devices (S421). Here, the electronic device 101 may be an electronic device of a representative user, for example, a user in charge of general management. The plurality of external electronic devices may be electronic devices of respective members.

The electronic device 101 may receive a user input (S423). The electronic device 101 may display a contact list on a display. The electronic device 101 may receive the user input to select a contact of at least one user from the contact list. Alternatively, when the user directly inputs a name and contact of a member to be included in the group, the electronic device 101 may receive the user input and include the member in the group.

The electronic device 101 may select a plurality of electronic devices to be included in the group based on the user input (S425). Here, the user refers to a general manager. When the user selects all or some of contacts of the user from the contact list displayed on the display, the electronic device 101 may include external electronic devices corresponding to the selected contacts in the group. Alternatively, when the user directly inputs the name and the contact of the member to be included in the group, the electronic device 101 may receive the user input and include an external electronic device corresponding to the contact in the group.

The electronic device 101 may receive cost information from at least one electronic device or external electronic device included in the group (S427). For example, when the representative user inputs cost information in the electronic device 101, the electronic device 101 may add the input cost information to group information. Also, when the cost information is input from the first external electronic device 103 owned by at least one of users of the external electronic devices, the first external electronic device 103 may transmit the cost information to the electronic device 101, and the electronic device 101 may receive the cost information and add the cost information to the group information. The group information may be stored in memory of the electronic device 101.

The electronic device 101 sums the received cost information (S429). The electronic device 101 may sum the cost information received from at least one of the plurality of external electronic devices. According to an embodiment, the server 109 may sum the cost information received from at least one of the plurality of external electronic devices and cost information input from the electronic device 101 and transmit the summed cost information to the electronic device 101.

The electronic device 101 may distribute the summed cost information based on the number of the electronic devices included in the group (S431). Group information may be stored in memory of the electronic device 101 or the server 109 and may include information about the number of the electronic devices included in the group, i.e. the number of the electronic device 101 and the first through third external electronic devices 103, 105, and 107. The electronic device 101 may obtain data regarding the number of the plurality of electronic devices from the group information and use the obtained data to determine the number of the plurality of electronic devices. The electronic device 101 may distribute the cost information by dividing the summed cost information by the number. For example, the group information stored in the memory of the electronic device 101 or the server 109 may store number information of the plurality of electronic devices '4'. When cost information of '300,000 won' is input from the electronic device 101 and cost information of '100,000 won' is input from the third external electronic device 107, the summed cost information of '40,000 won' may be stored in the group information.

The electronic device 101 may transmit the distributed cost information to the plurality of electronic devices included in the group (S433). The electronic device 101 may obtain distributed cost information of "100,000 won" by dividing the cost information of "40,000 won" by 4 and transmit the distributed cost information of "100,000 won" to the first through third external electronic devices 103, 105, and 107.

According to an embodiment, the electronic device 101 may transmit the distributed cost information to some of the external electronic devices included in the group. For example, when only some of members included in the group participate in a company dinner and share cost, the electronic device 101 or the external electrode device may input cost information and a list of members to share the cost. In this case, the electronic device 101 may transmit information about the cost to be shared only to the some members participating in the company dinner.

For example, when only users of the electronic device 101 and the first and third external electronic devices 103 and 107 participate in the company dinner, the electronic device 101 may divide summed cost information '40,000 won' by the number of participants '3' and determine cost information to be shared as '130,000 won'. The electronic device 101 may transmit the shared cost information '130,000 won' to the first and third external electronic devices 103 and 107.

FIGS. 5A to 5D show examples of a group generating process performed by the electronic device 101 according to an embodiment.

Figure 5A:
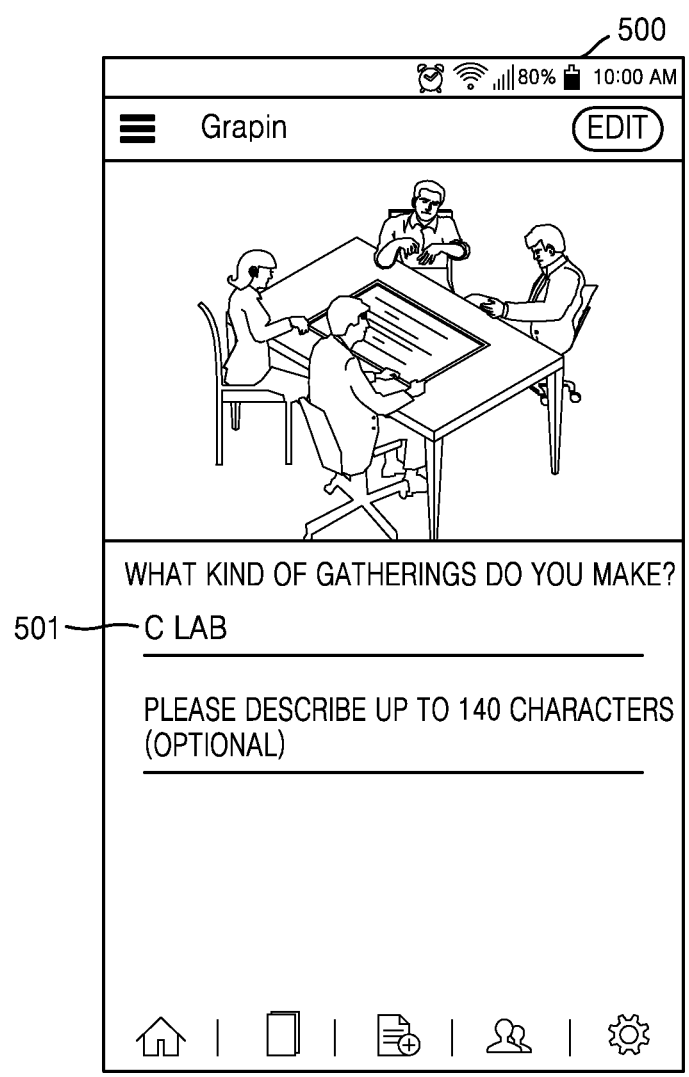
FIGS. 5A, 5B, 5C, and 5D show examples of a group generating process performed by an electronic device, according to an embodiment.

Referring to FIG. 5A, a UI 501 for generating a group may be displayed on a display 500 of the electronic device.

When a user executes an application in the electronic device 101 (FIG. 1), the electronic device 101 may display the UI 501 requesting the display 500 to input a group name. When the user inputs the group name, the electronic device 101 may receive a user input and transmit the input group name to the server 109. The server 109 may generate the group using the group name. The generated group may be stored in memory of the server 109.

The user may select members to be included in the group by using a contact list stored in the electronic device 101. That is, the user may select participants to share cost by using a telephone number list stored in the electronic device 101.

Figure 5B:
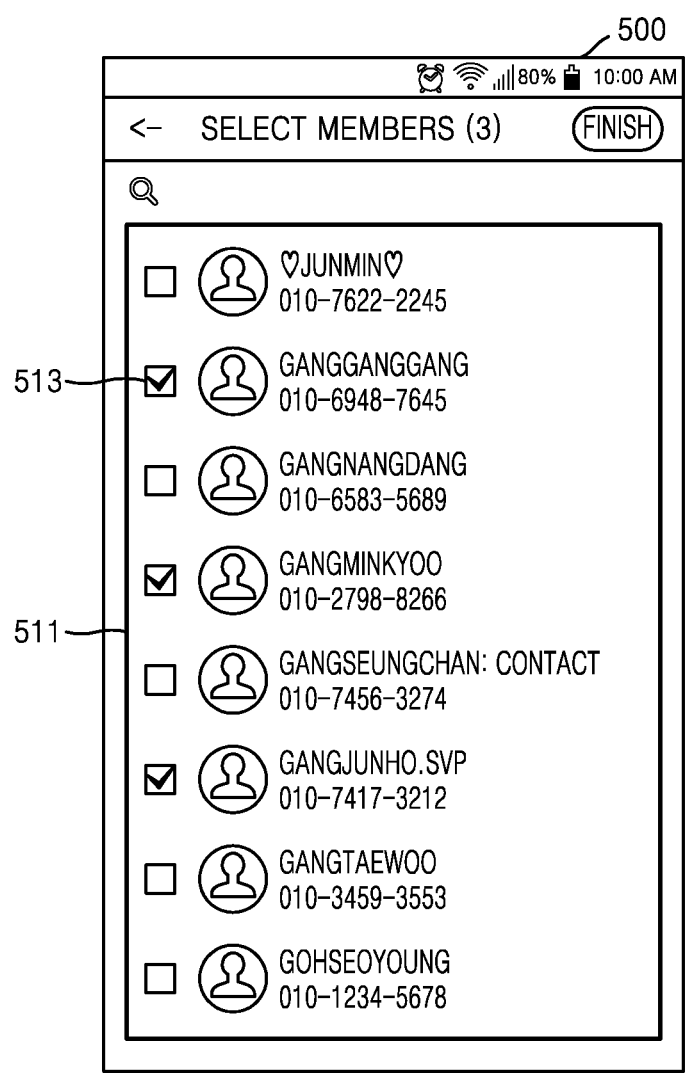

Referring to FIG. 5B, a contact list 511 may be displayed on the display 500. When the user selects at least one of the contact list 511 of the user displayed on the display 500, an external electronic device corresponding to the selected contact may be included in the group. For example, when the user selects 'Ganganggang 513' in the contact list 511, an electronic device (for example, a smartphone) used by 'Ganganggang' may be included in the group.

Or the electronic device 101 may include in the group an electronic device corresponding to a contact based on a user input directly inputting the contact.

Figure 5C:
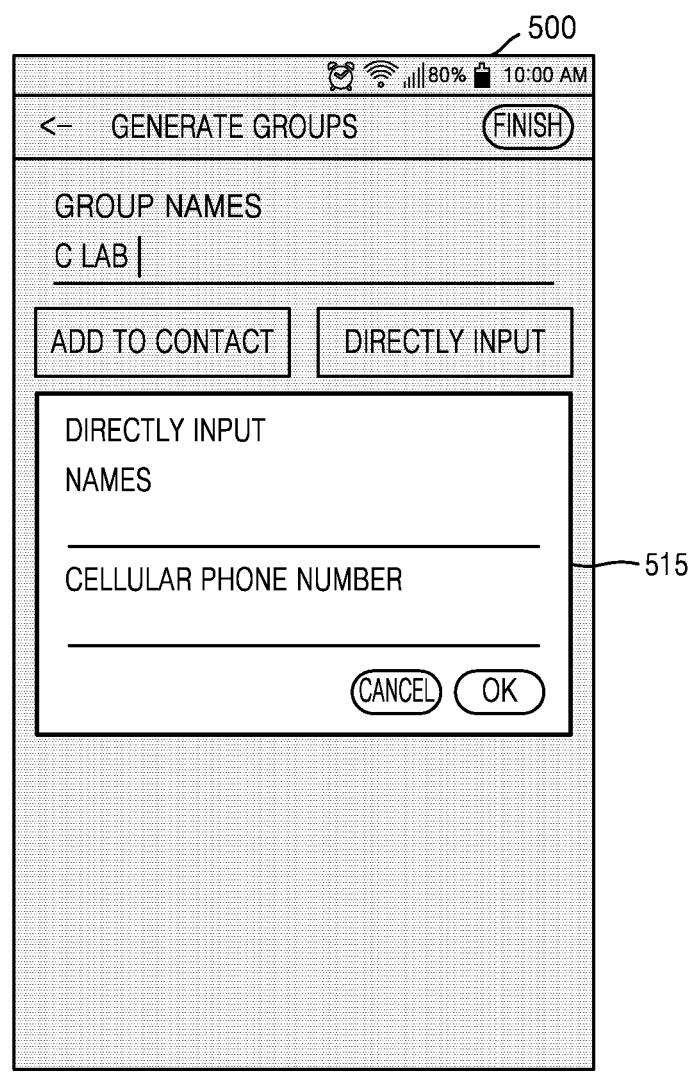

Referring to FIG. 5C, a UI 515 for inputting a contact on the display 500 may be displayed.

When the user inputs the contact using the UI 515, the electronic device 101 may include an electronic device corresponding to the input contact in the group.

The server 109 may send information about the group to at least one electronic device included in the group. The information about the group may include a URL for accessing the server 109 and/or a URL for installing an application providing a service according to an embodiment, and may be transmitted in a text message.

Figure 5D:
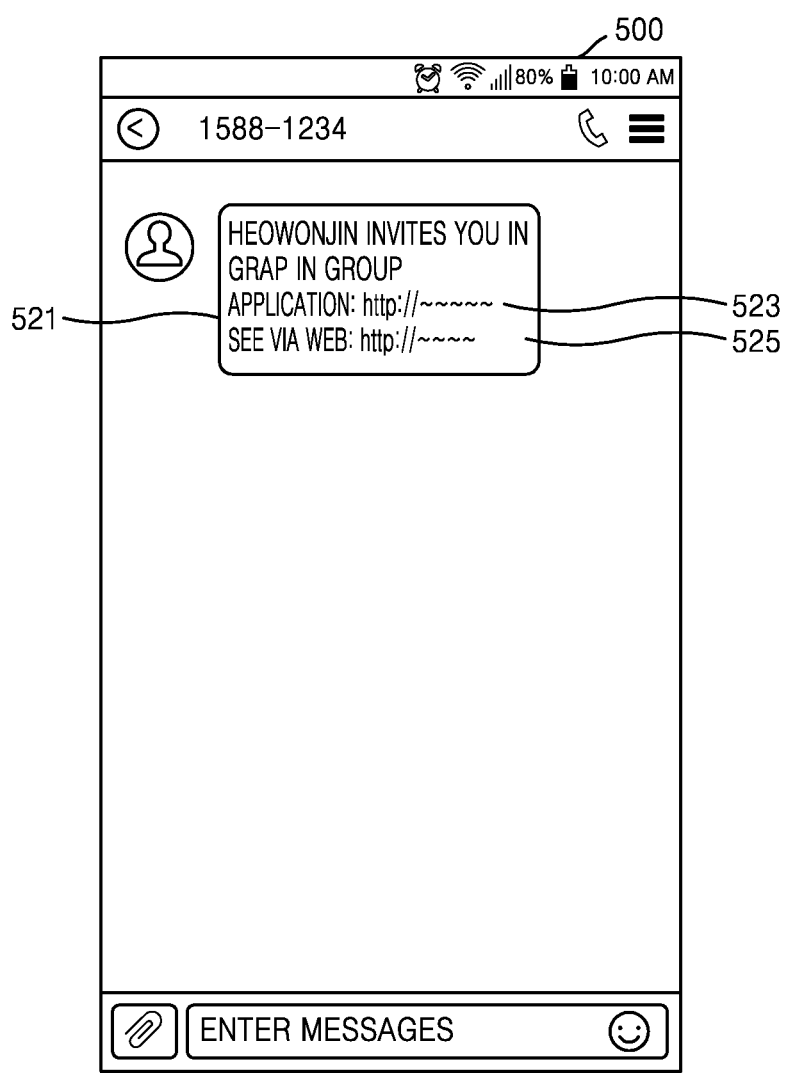

Referring to FIG. 5D, a text message 521 may be displayed on the display 500 of the electronic device 101. The text message 521 may include a URL 523 for installing an application and a server address 525.

FIGS. 6A to 6G show examples of inputting cost information used by an electronic device.

Figure 6A:
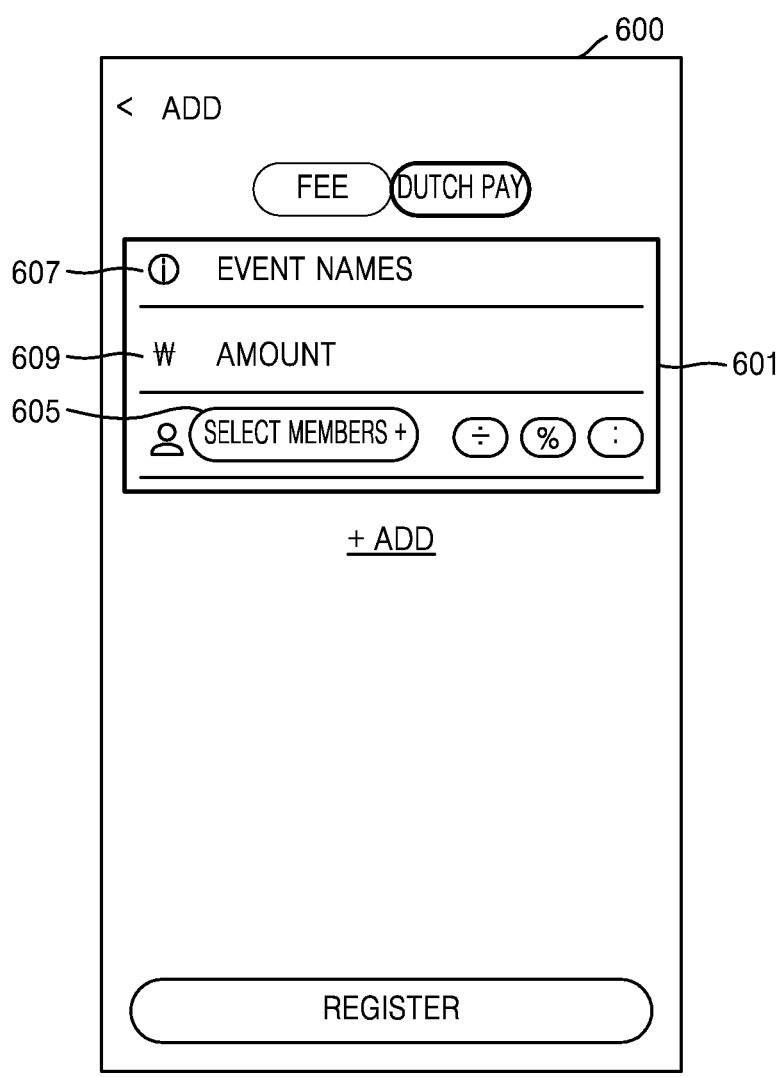

Referring to FIG. 6A, a UI 601 for inputting cost information may be displayed on a display 600 of the electronic device. Here, the electronic device may be at least one of the electronic device 101, the first external electronic device 103, the second external electronic device 105, and the third external electronic device 107 described in FIG. 1.

The UI 601 may include a use history 607, a use cost 609, and a participant selection button 605. The use cost 609 may be input directly by a user or automatically by using a text message received from the electronic device. Alternatively, the use cost 609 may be input using an image obtained by capturing a receipt using a camera built in the electronic device. Alternatively, the use cost 609 may be input by using a receipt image stored in memory of the electronic device.

A payer may be automatically input with a user name of the electronic device. In other words, a payer name may be the user of the electronic device. When the user touches the participant selection button 605, the display 600 may display a list from which names of participants who will share cost may be selected. This will be described later with reference to FIGS. 6F and 6G.

Referring to FIG. 6B, the display 600 may display a UI 615 for selecting participants.

The electronic device may distribute cost according to the number of the participants selected by the user and display cost information 615 to be paid by each participant on the display 600.

At the top of the display 600, UIs 611 and 613 for selecting a distribution method may be displayed on the display 600.

When the user selects the UI 611, the cost may be distributed according to the number of the participants. When the user selects the UI 613, a ratio of the cost to be shared by the participants may be set.

Figure 6C:
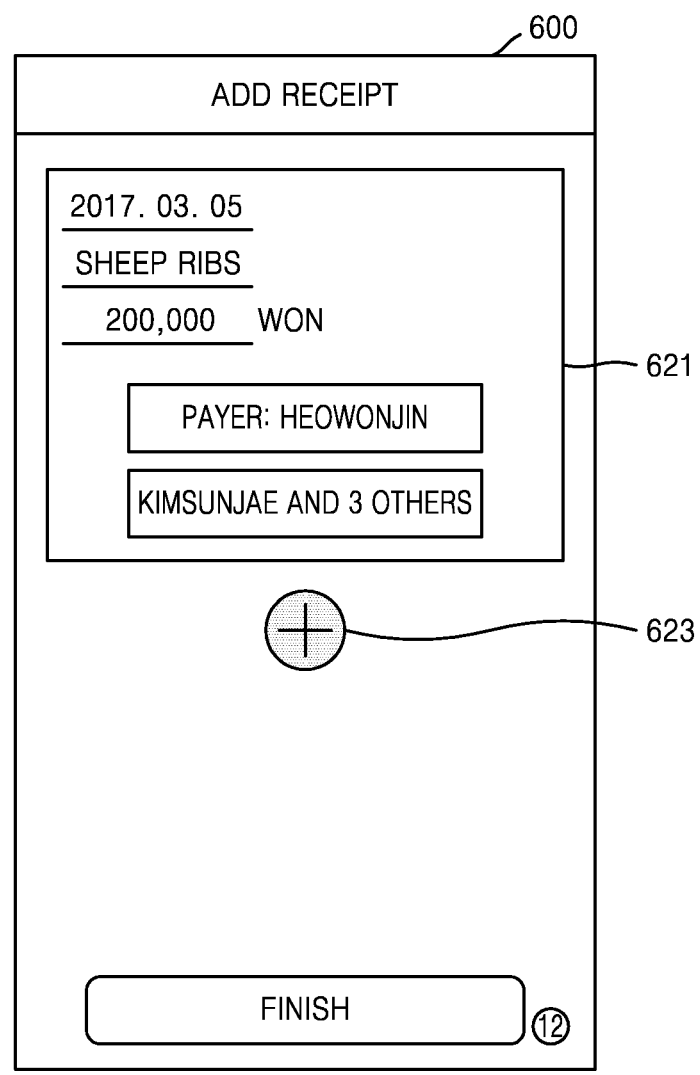

Referring to FIG. 6C, a template UI 621 and a UI 623 for adding cost used by the user may be displayed on the display 600.

The template UI 621 may include a button for selecting cost used, items used, a name of a payer, and participants. According to an embodiment, the template UI 621 may further include a button (not shown) for adding a receipt. When the user selects the receipt addition button, the electronic device may operate a camera to obtain a receipt image through the camera.

When the user selects the UI 623, a template UI having the same type as the template UI 612 may be displayed on the display 600.

Figure 6D:
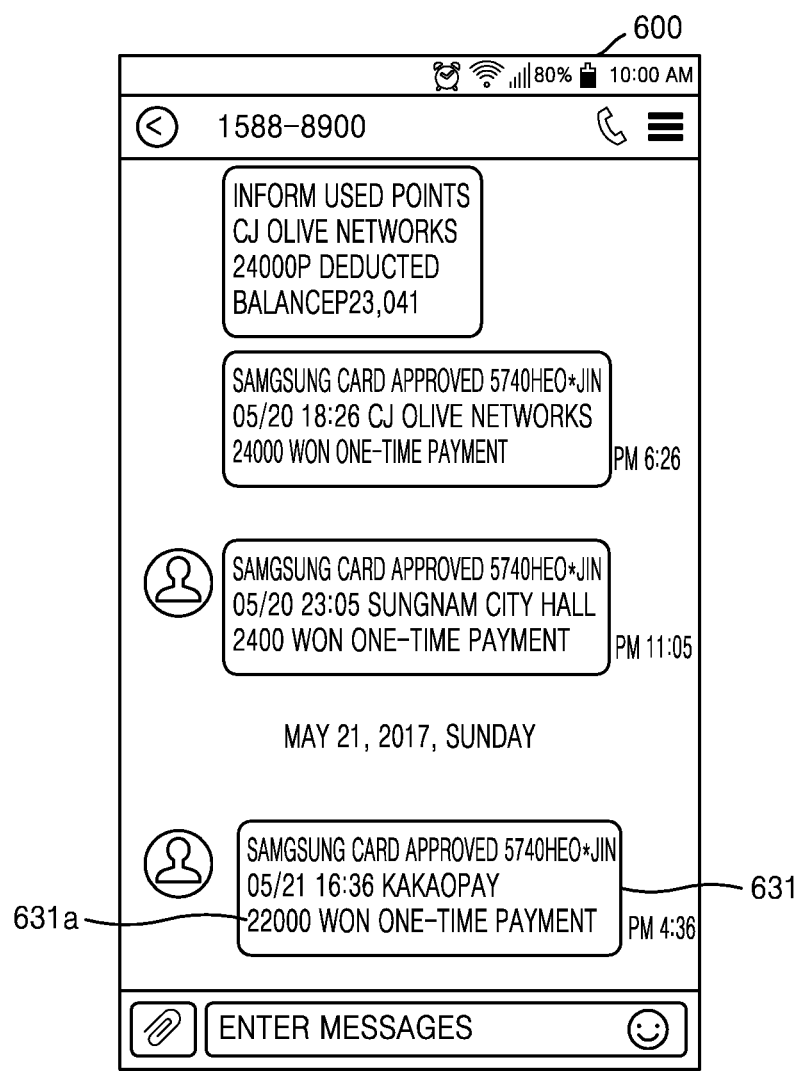
Figure 6E:

FIGS. 6D and 6E show examples in which the electronic device receives cost.

The electronic device may receive the cost through a text message 631. For example, when the user touches the text message 631 displaying the cost, cost information 631a included in the text message 631 may be input as the cost.

In another example, the electronic device may receive the cost through a receipt. When the user captures the receipt with the camera included in the electronic device, a receipt image may be input to the electronic device, and the electronic device may extract cost information from the receipt image through OCR processing of the receipt image. Meanwhile, the receipt may include a QR code including information used to handle cost spent jointly. When the user captures the QR code using the camera, the electronic device may extract the cost information from the QR code.

Figure 6F:
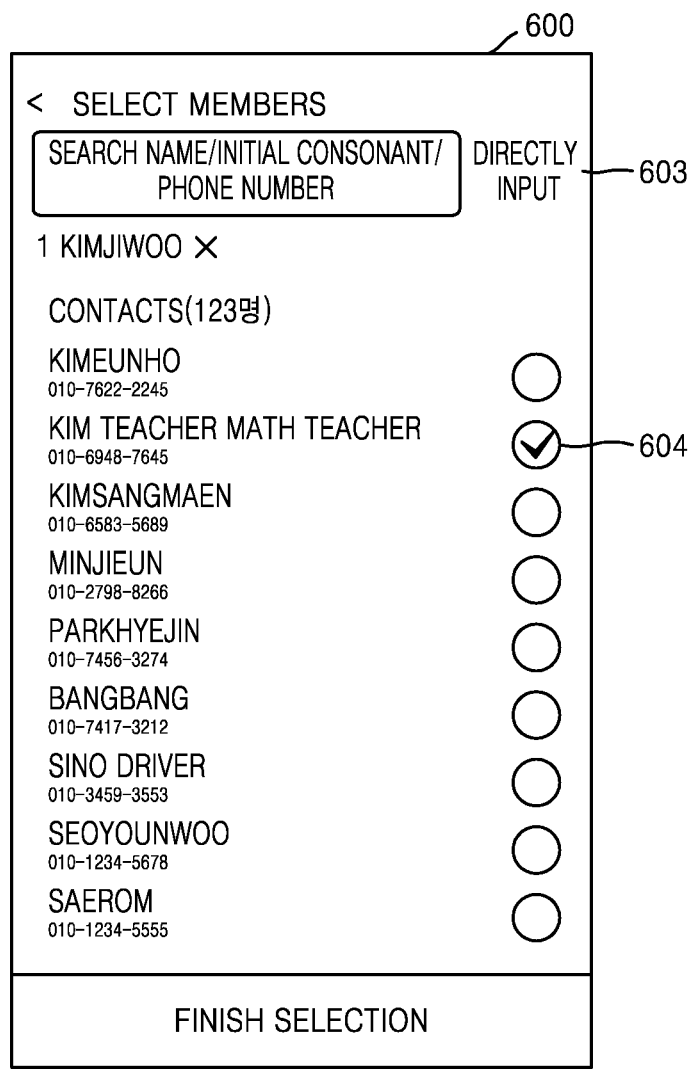
Figure 6G:
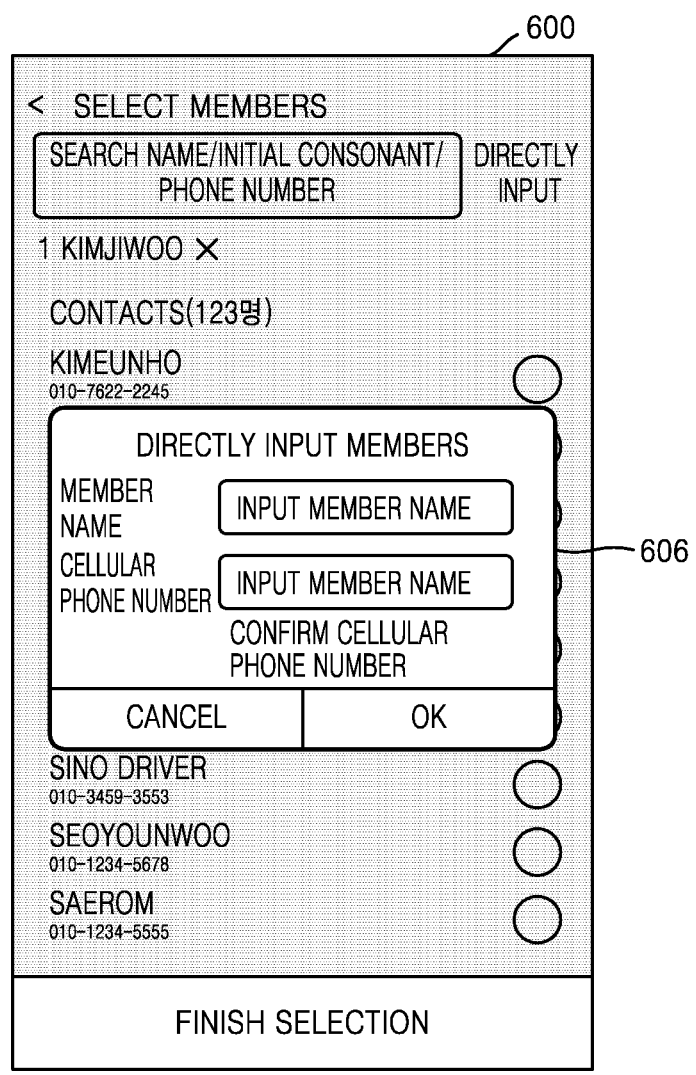

FIGS. 6F and 6G show examples of selecting participants to share cost.

Referring to FIG. 6F, when the user selects the participant selection button 605 shown in FIG. 6A, a contact list and the UI 603 may be displayed on the display 600. The user may touch a check box 604 on the contact list to select participants.

Alternatively, when the user touches the UI 603 displayed on the display 600, a pop-up window 606 for directly inputting participants may be displayed on the display 600.

Referring to FIG. 6G, the pop-up window 606 may be displayed on the display 600.

The pop-up window 606 may display boxes for inputting participant names and contacts.

Figure 7:
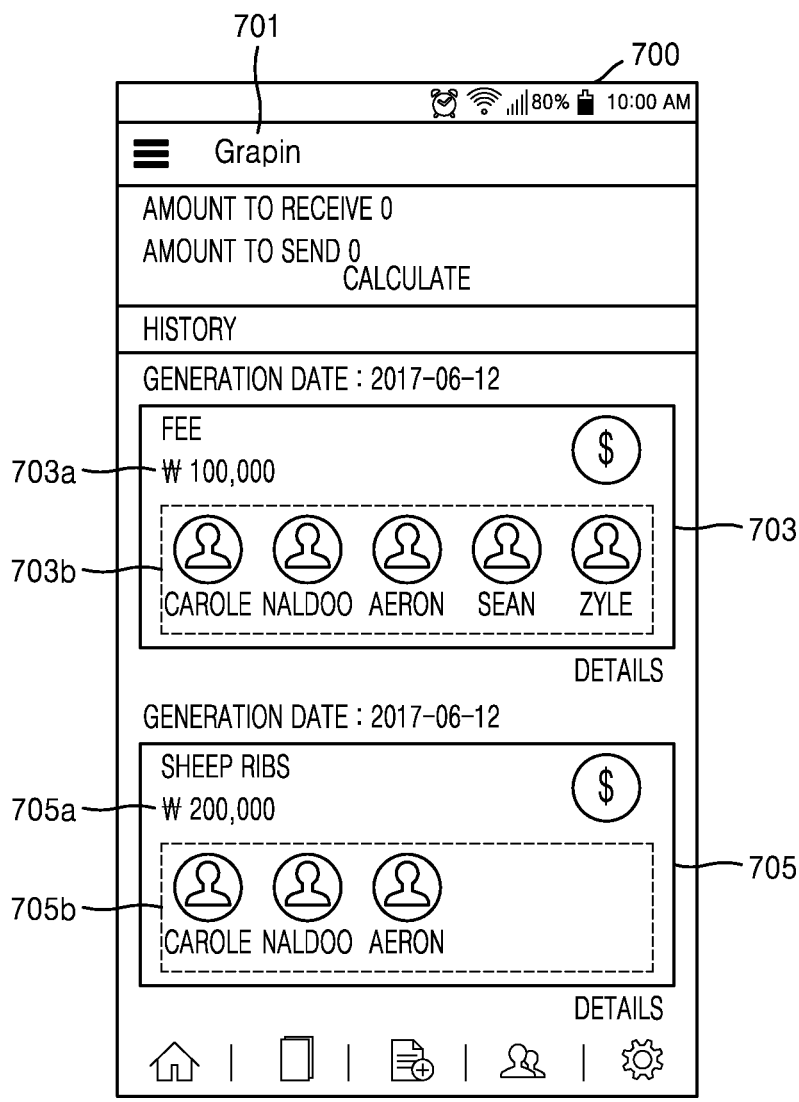
FIG. 7 shows an example of cost sharing status information displayed on a display of an electronic device.

FIG. 7 shows an example of cost sharing status information displayed on a display 700 of an electronic device.

Referring to FIG. 7, the electronic device may display a group name 701, a first item 703, and a second item 705 on the display 700 on the display 700.

The first item 703 may be, for example, information about fee status of the group name 701. The first item 703 may include cost information 703a and a member list 703b for paying a fee. The electronic device may distribute the cost information 703a to the number of members of the member list 703b and transmit the distributed cost information 730a to relevant electronic devices by using the member list 703b. The member list 703b may be a part of a contact list stored in the electronic device.

The second item 705 may be, for example, information about a status of a joint meal cost of the group name 701. The second item 705 may include cost information 705a and a member list 705b to share cost. The electronic device may distribute the cost information 705a to the number of members of the member list 705b and transmit the distributed cost information 705a to relevant electronic devices by using the member list 705b. The member list 705b may be a part of a contact list stored in the electronic device.

Figure 8:
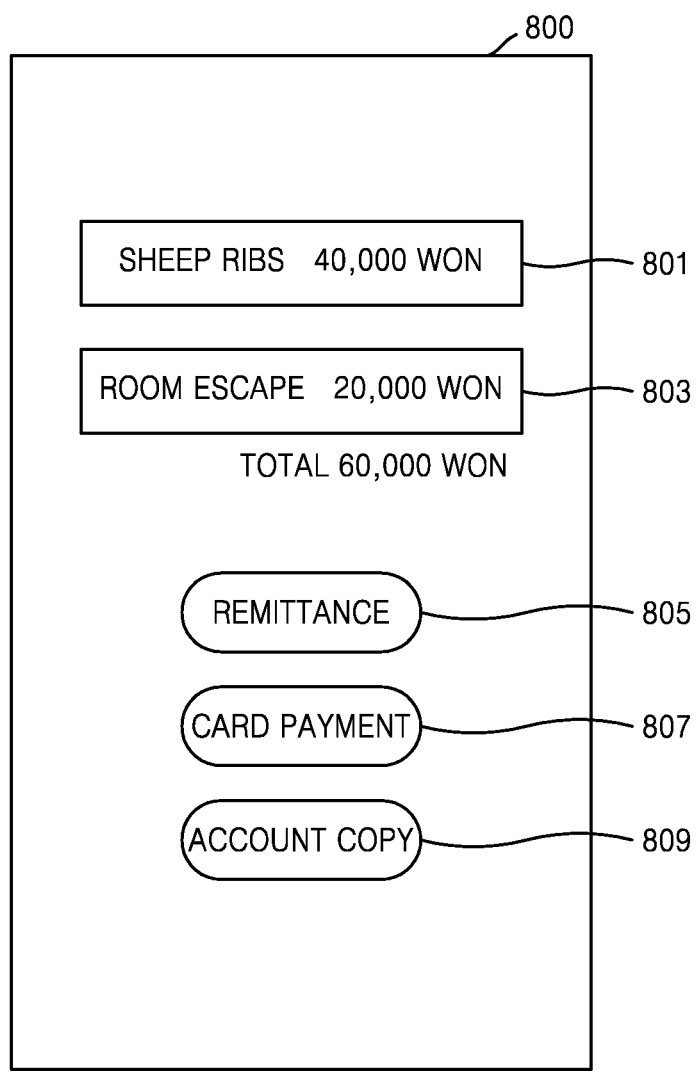
FIG. 8 shows an example of cost sharing information received by an external electronic device.

FIG. 8 shows an example of cost sharing information received by an external electronic device.

Referring to FIG. 8, a first item 801, a second item 803, and UIs 805, 807, and 809 are shown. The UIs 805, 807, and 809 may be, for example, touch buttons.

The first item 801 and the second item 803 may include cost information to be shared by a user of the external electronic device.

The user may select the UIs 805, 807, 809 to transmit sharing cost to a group account. Alternatively, the user may select the UIs 805, 807, and 809 to transmit the sharing cost to an account of a representative user (e.g., a representative payer) who paid the sharing cost in advance.

For example, when the user selects the UI 805, cost to be shared by the user of the external electronic device may be transmitted to the group account.

When the user selects the UI 807, the cost to be shared by the user of the external electronic device may be settled to a designated credit card.

When the user selects the UI 809, a group account number may be copied to memory.

Figure 9A:
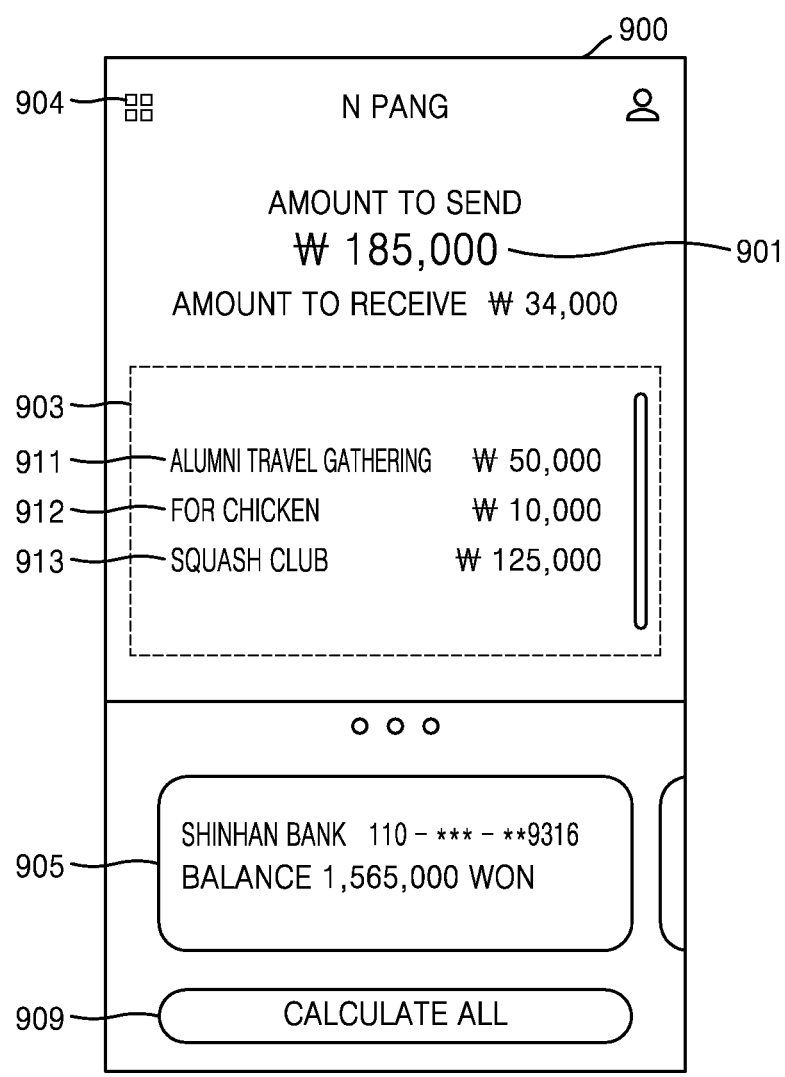
FIGS. 9A, 9B, and 9C show examples of cost sharing status information displayed on an electronic device.
Figure 9B:
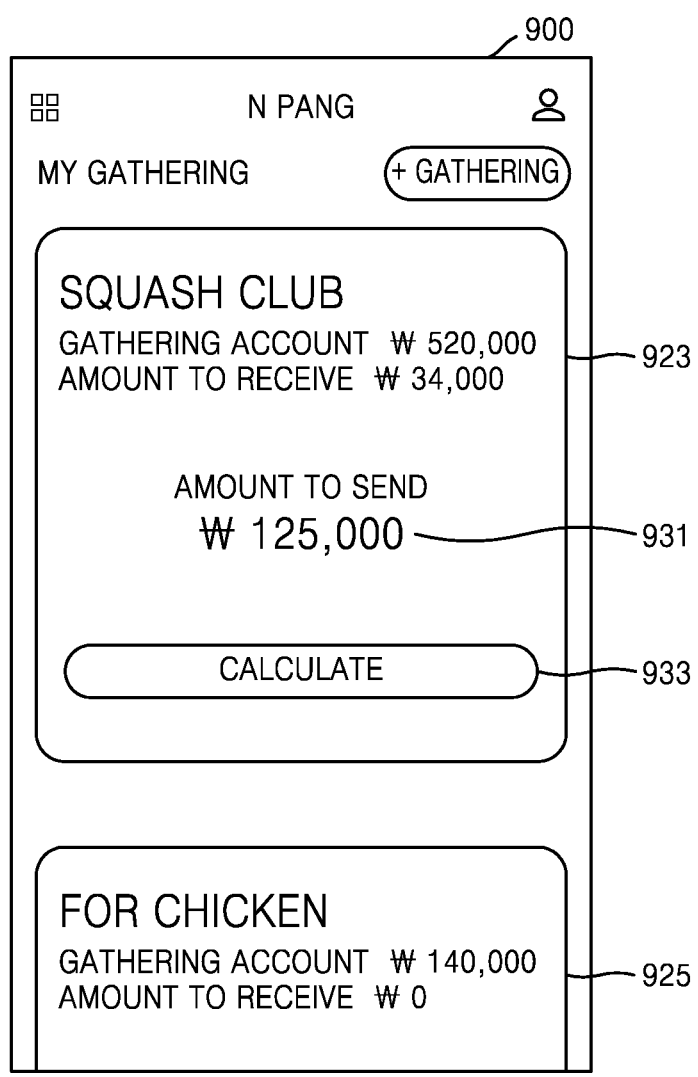
Figure 9C:
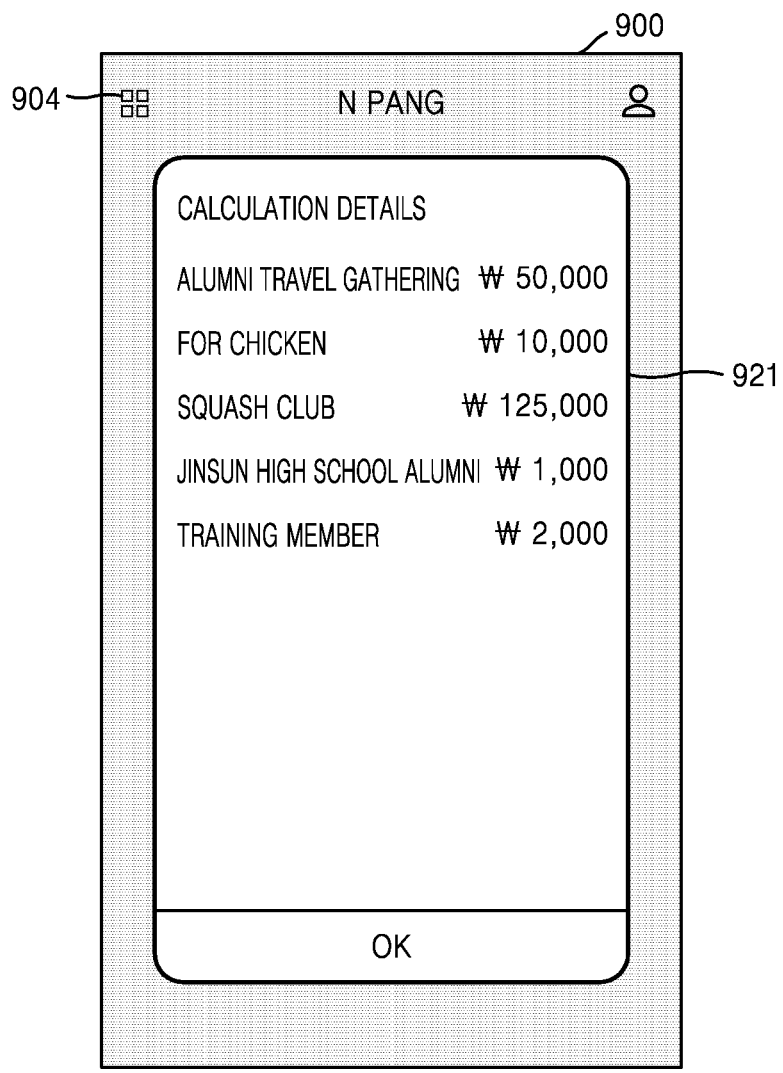

FIGS. 9A to 9C show examples of cost sharing status information displayed on an electronic device.

Referring to FIG. 9A, a cost sharing status 903, a total cost 901, user account information 905, and a calculation button 909 for each group with respect to a user of the electronic device may be displayed on a display 900. The user account information 905 may be an account for calculating cost and may include information about a balance.

The cost sharing status 903 may include information about a name of each group and sharing amounts 911, 912, and 913. A total cost 901 with respect to the name of each group and the sharing amounts 911, 912, and 913 may be displayed at a top region of the display 900.

When the user selects the calculation button 909, the total cost 901 may be transmitted from an individual withdrawal account 905.

Meanwhile, when the user selects a button 904 or swipes a screen from left to right, detailed status information according to groups may be displayed on the display 900.

Referring to FIG. 9B, detailed status information 923 and 925 according to groups may be displayed on the display 900.

The detailed status information 923 and 925 according to groups may be scrolled up and down according to a drag operation of the user. The detailed status information 923 may include information 931 about cost to be remitted and a calculation button 933. When the user touches the calculation button 933, the cost may be calculated according to groups.

Referring to FIG. 9C, a full calculation history list 921 may be displayed on the display 900. When the user selects the cost sharing status 903 shown in FIG. 9A, the full calculation history list 921 according to groups may be displayed on the display 900.

Figure 10A:
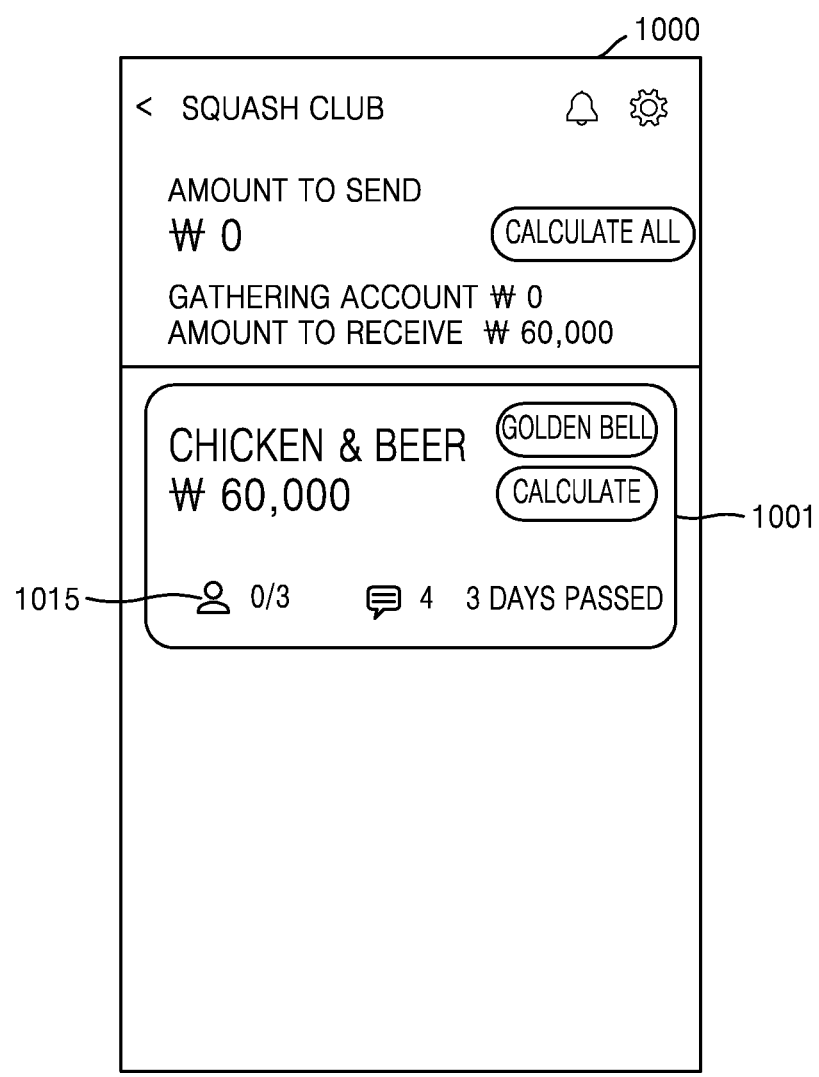
FIGS. 10A and 10B show examples in which an electronic device inputs cost sharing information, according to an embodiment.
Figure 10B:
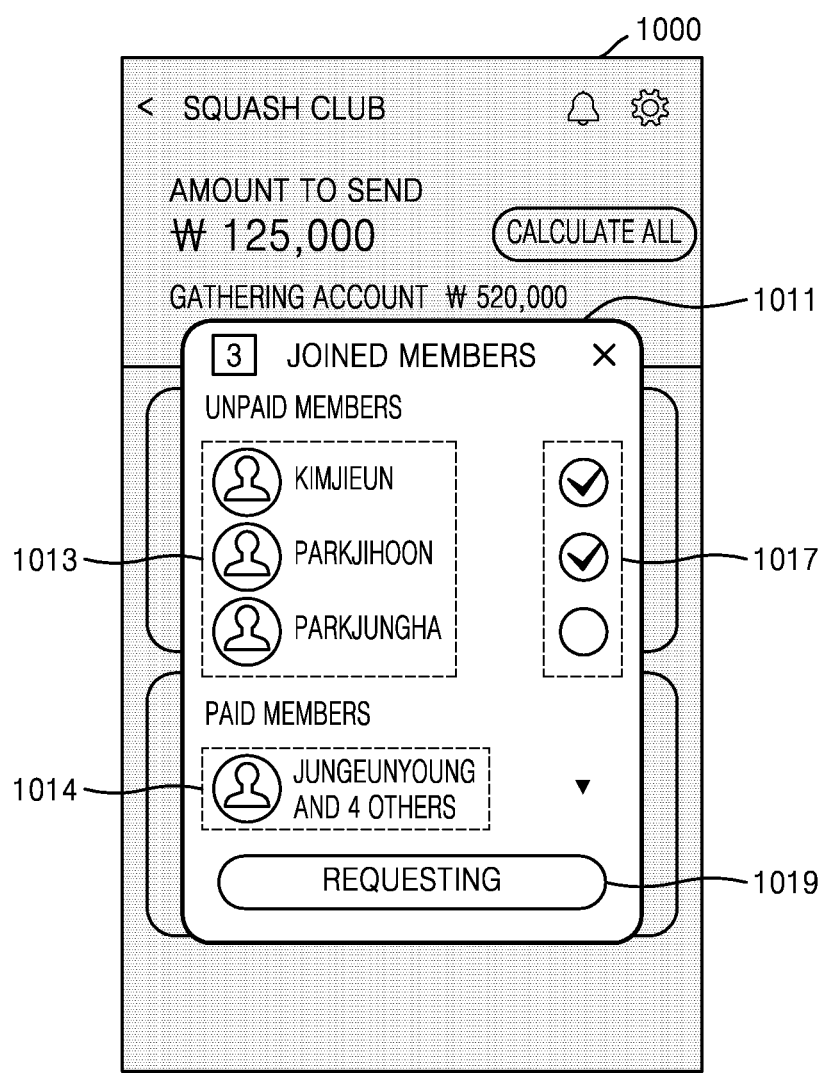

FIGS. 10A and 10B show examples in which an electronic device inputs cost sharing information according to an embodiment.

Referring to FIG. 10A, a display 1000 of the electronic device may display cost status information 1001 shared by members included in a group.

The cost status information 1001 may include a member icon 1015. When a user selects the member icon 1015, the electronic device may display on the display 1000 a detailed status of a member who shares cost. Here, the user may be, for example, a general manager (e.g., a representative user) of the group or a person who paid the cost.

Referring to FIG. 10B, a payment status 1011 with respect to members who share the cost may be displayed on the display 1000.

The payment status 1011 may be divided into the member 1014 who has calculated the cost and a member 1013 who has not calculated the cost. A check button 1017 may be displayed next to a name of the member 1013 who has not calculated the cost. The user may select the member 1013 who has not calculated the cost by selecting the check button 1017 and transmit a notification message to the member 1013 who has not calculated the cost by selecting a button 1019.

Figure 11A:
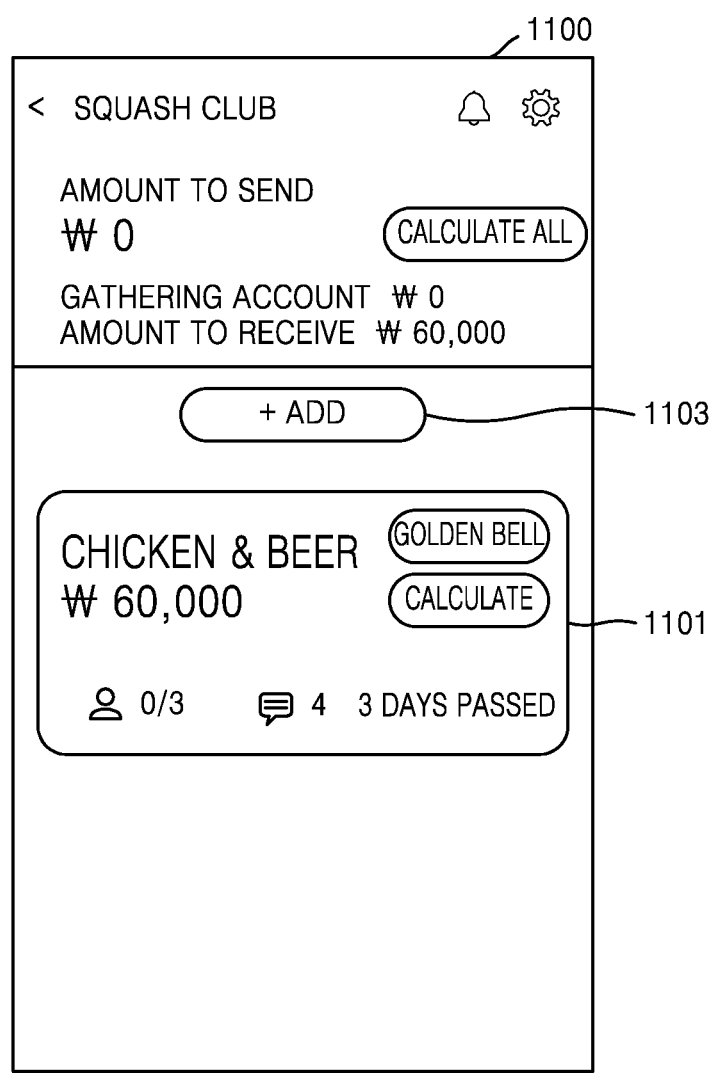
FIGS. 11A and 11B show examples in which an electronic device inputs costs, according to an embodiment.
Figure 11B:
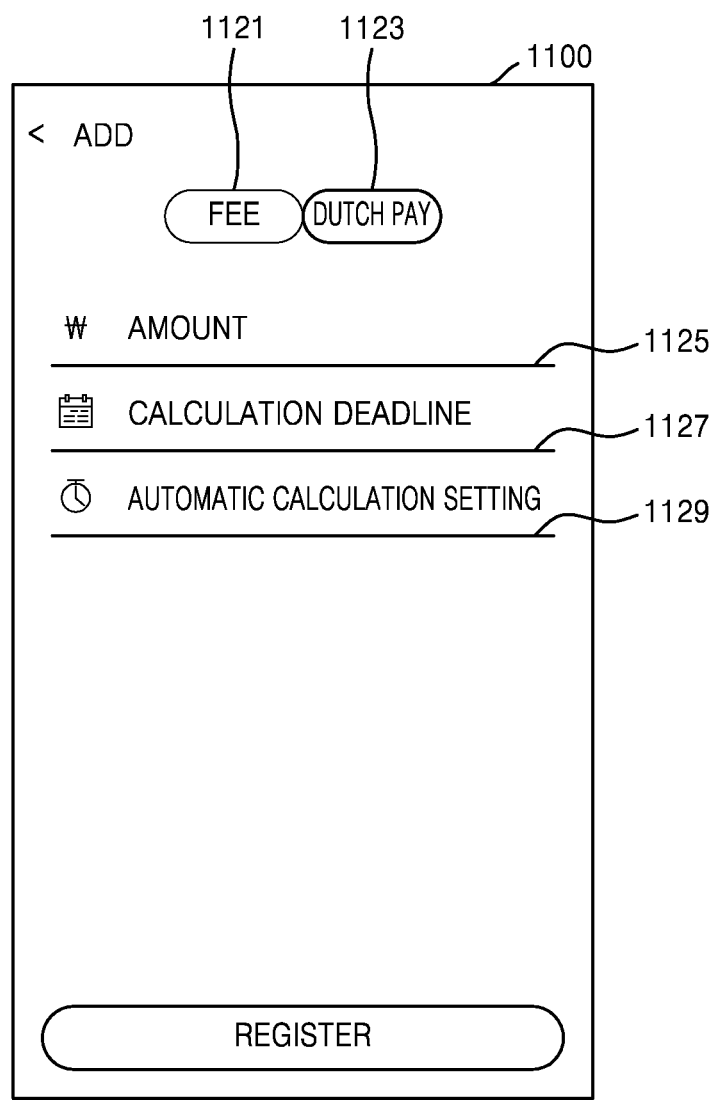

FIGS. 11A and 11B show examples in which an electronic device inputs cost according to an embodiment.

Referring to FIG. 11A, a cost status 1101 and a sharing cost input button 1103 may be displayed on a display 1100 of the electronic device.

When a user selects the sharing cost input button 1103 in the electronic device, the electronic device may display a fee button 1121 and a touch pay button 1123 on the display 1100 separately.

Referring to FIG. 11B, when the user selects the fee button 1121, a cost 1125, a deadline 1127, and an automatic calculation schedule 1129 may be input. When the user inputs the automatic calculation schedule 1129, the cost may be automatically calculated on a relevant date.

Figure 12A:
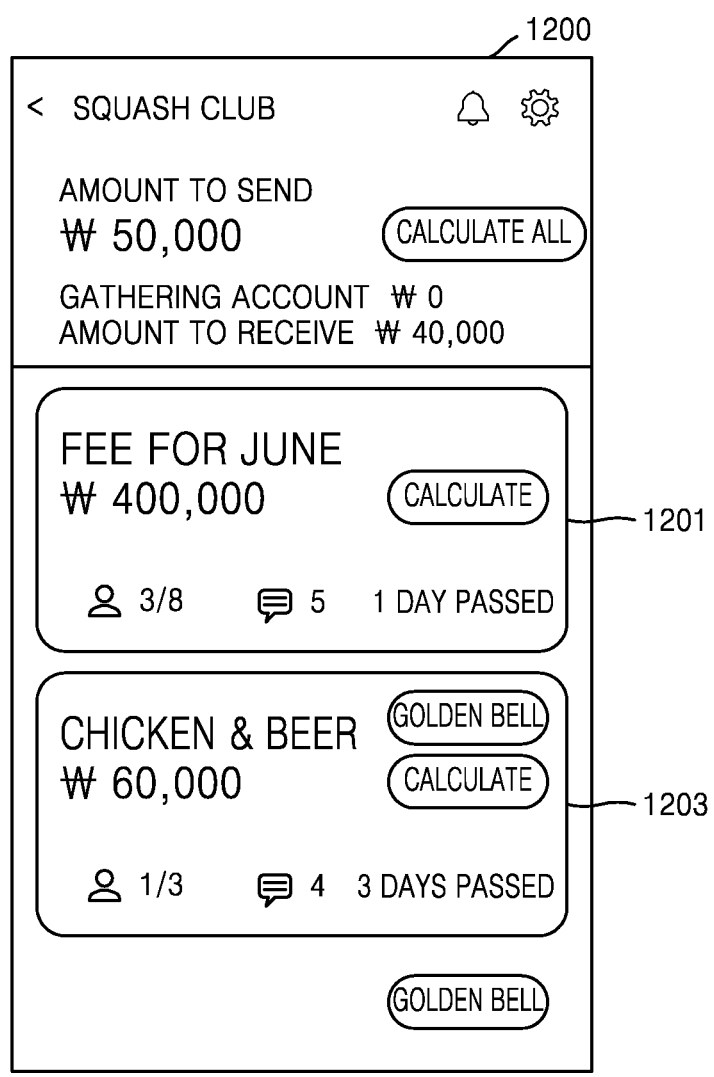
FIGS. 12A and 12B show examples in which an electronic device displays cost status information, according to an embodiment.
Figure 12B:
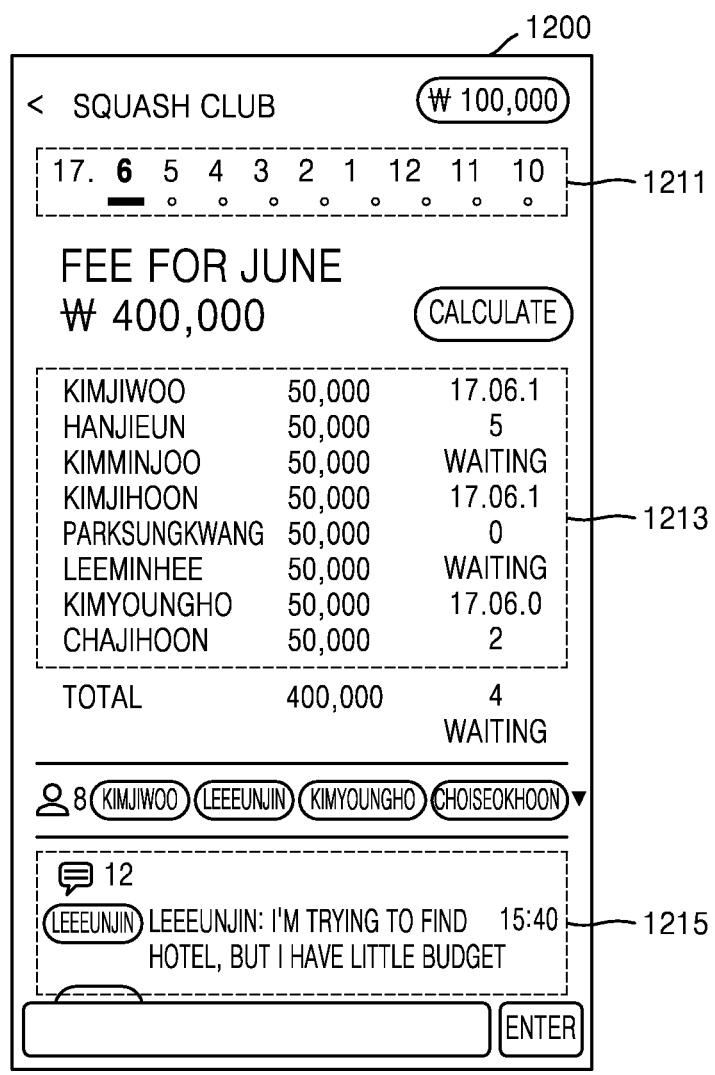

FIGS. 12A and 12B show examples in which an electronic device displays cost status information according to an embodiment.

Referring to FIG. 12A, the electronic device may display cost statuses 1201 and 1203 according to items on a display 1200.

When a user taps a region on which the cost statuses 1201 and 1203 are displayed, the electronic device may display a cost payment status of members on the display 1200.

Referring to FIG. 12B, a UI 1211 for selecting a cost payment status 1213 of members and a monthly status may be displayed on the display 1200. Further, messages left by the members may be displayed on a lower region 1215 of the display 1200.

Figure 13:
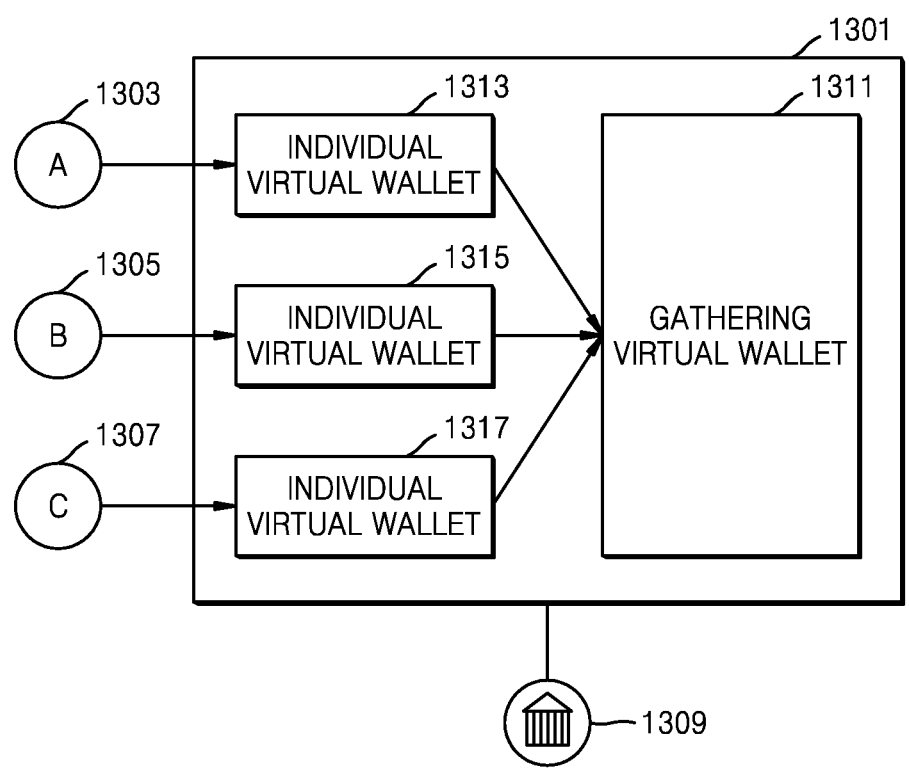
FIG. 13 shows an example in which an electronic device generates virtual wallets to calculate a cost, according to an embodiment.

FIG. 13 shows an example in which an electronic device 1301 generates individual virtual wallets 313, 1315, and 1317 to calculate cost according to an embodiment.

Referring to FIG. 13, the electronic device 1301, external electronic devices 1303, 1305, and 1307, and a financial server 1309 are shown. The electronic device 1301 may be a server.

The external electronic device 1303 may be, for example, a smartphone of the user A.

The external electronic device 1305 may be, for example, a smartphone of the user B.

The external electronic device 1307 may be, for example, a smartphone of the user C.

The electronic device 1301 may include memory and a processor electrically connected to the memory. The memory may include instructions set to group a plurality of external electronic devices into one group when the processor operates, generate a group virtual wallet corresponding to the group, receive user information of at least one external electronic device included in the group from the at least one external electronic device, and generate an individual virtual wallet corresponding to a user based on the received user information.

When the user A of the external electronic device 1303 may execute an application providing a service according to an embodiment and inputs information about the user A, the external electronic device 1303 may transmit the information to the electronic device 1301. The electronic device 1301 may use the information to generate the individual virtual wallet 1313 of the user A.

When the user B of the external electronic device 1305 may execute the application providing the service according to an embodiment and inputs information about the user B, the external electronic device 1305 may transmit the information to the electronic device 1301. The electronic device 1301 may use the information to generate the individual virtual wallet 1315 of the user B.

When the user C of the external electronic device 1307 may execute the application providing the service according to an embodiment and inputs information about the user C, the external electronic device 1305 may transmit the information to the electronic device 1301. The electronic device 1301 may use the information to generate the individual virtual wallet 1317 of the user C.

The individual virtual wallets 1313, 1315, and 1317 may include virtual account numbers in cooperation with the financial server 1309. The virtual account numbers are financial account information and may be transmitted from the financial server 1309.

Also, respective users may charge money to the individual virtual wallets 1313, 1315, and 1317 and pay cost allowed to individuals using the individual virtual wallets 1313, 1315, and 1317. To charge money to the individual virtual wallets 1313, 1315, 1317, the users may use credit cards, transfer money from their financial accounts, or transfer money to virtual account numbers. That is, the users may transfer the money in the individual virtual wallets 1313, 1315, and 1317 to a gathering virtual wallet 1311 to pay the cost to be shared by the users. Here, 'money' means information corresponding to an amount of the money. The 'wallet' may store information about the money and may be provided in memory of the electronic device 1301 or in memories of the electronic devices 1303, 1305, and 1307.

The gathering virtual wallet 1311 may be a wallet allocated to a group. When the group is generated, the gathering virtual wallet 1311 may be generated. The gathering virtual wallet 1311 may be referred to as a group virtual wallet. The gathering virtual wallet 1311 may receive or send money from or to the individual virtual wallets 1313, 1315, and 1317. The gathering virtual wallet 1311 may be linked with the financial server 1309 to receive the virtual account number. The money stored in the gathering virtual wallet 1311 may be used to calculate cost spent in the group. The gathering virtual wallet 1311 may store amount information such as a fee of the group, and may be provided in the memory of the electronic device 1301.

The term 'module' used herein includes a unit configured as hardware, software, or firmware and may be used interchangeably with terms, for example, logic, logic blocks, components, or circuits. The 'module' may be an integrally constructed component or a minimum unit or part thereof that performs one or more functions. The 'module' may be implemented either mechanically or electronically and may include, for example, application-specific integrated circuit (ASIC) chips, field-programmable gate arrays (FPGAs) or programmable logic devices that perform certain operations, are known, or will be developed in the future. At least some of devices (e.g., modules or functions thereof) or methods (e.g., operations) according to various embodiments may be implemented as instructions stored in a computer readable storage medium (e.g., the memory 130). When the instructions are executed by a processor (e.g., the processor 120), the processor may perform a function corresponding to the instructions. The computer readable recording medium may include a hard disk, a floppy disk, a magnetic medium (e.g. a magnetic tape), an optical recording medium (e.g., CD-ROM or a DVD), a magnetic-optical medium (e.g. a floppy disk), internal memory, etc. The instructions may include code generated by a compiler or code that may be executed by an interpreter. Modules or program modules according to various embodiments may include at least one or more of the elements described above, some of which may be omitted, or other elements. Operations performed by modules, program modules, or other components, according to various embodiments, may be performed sequentially, in parallel, repetitively, or heuristically, or at least some operations may be performed in a different order or omitted, or other operations may be added.

The disclosed embodiments may be implemented in a software program that includes instructions stored on a computer-readable storage medium.

A computer may be a device capable of calling stored instructions from a storage medium and operating according to the disclosed embodiments according to the called instructions and include an electronic device according to the disclosed embodiments.

The computer-readable storage medium may be provided in the form of a non-transitory storage medium. Here, 'non-temporary' means that the storage medium does not include a signal and is tangible, but does not distinguish whether data is stored semi-permanently or temporarily on a storage medium.

Also, the control method according to the disclosed embodiments may be provided in a computer program product. A computer program product may be traded between a seller and a purchaser as a commodity.

The computer program product may include a software program and a computer-readable storage medium having the software program stored therein. For example, the computer program product may include a product in the form of a software program (e.g., a downloadable app) that is electronically distributed through a manufacturer of an electronic device or an electronic marketplace (e.g., Google Play Store or AppStore). For electronic distribution, at least a part of the software program may be stored on a storage medium or may be created temporarily. In this case, the storage medium may be a storage medium of a server of a manufacturer, a server of an electronic market, or a relay server for temporarily storing the SW program.

What is claimed is:

1. A method of an electronic device for obtaining and providing cost information, the method comprising:
   obtaining, by the electronic device, information related to a plurality of electronic devices from at least one of the plurality of electronic devices;
   identifying a group based on the obtained information related to the plurality of electronic devices;
   receiving, by the electronic device, cost information from each of the plurality of electronic devices, each of the cost information including a cost amount and an identification of a corresponding electronic device;
   identifying a cost amount of the group based on the received cost information and the information related to the plurality of electronic devices;
   calculating, by the electronic device, the cost amounts to be allocated to the plurality of electronic devices, based on the cost amount of the group and the obtained information related to the plurality of electronic devices;
   identifying, by the electronic device, information related to the calculated cost amounts corresponding to the plurality of electronic devices; and
   transmitting, by the electronic device, the identified information related to the calculated cost amounts to the plurality of electronic devices.

2. The method of claim 1, further comprising:
   generating a group virtual wallet.

3. The method of claim 1, wherein the group is identified based on a member list received from the at least one of the plurality of electronic devices.

4. The method of claim 1, further comprising:
   receiving, by the electronic device, financial account information from the at least one of the plurality of electronic devices; and
   obtaining, from a financial server, transaction history information about a financial account, based on the financial account information.

5. A method comprising:
   receiving, by an electronic device, an input;
   selecting, based on the input, a plurality of electronic devices;
   identifying a group based on the plurality of electronic devices selected based on the input;
   receiving, by the electronic device, cost information from each of the plurality of electronic devices, each of the cost information including a cost amount and an identification of a corresponding electronic device;
   identifying a cost amount of the group based on the received cost information and the information related to the plurality of electronic devices;
   calculating, by the electronic device, cost amounts to be allocated to the plurality of electronic devices, based on the cost amount of the group and the obtained information related to the plurality of electronic devices;

identifying, by the electronic device, information related to the calculated cost amounts corresponding to the plurality of the electronic devices; and transmitting, by the electronic device, the identified information related to the calculated cost amounts to the plurality of electronic devices.

6. The method of claim 5, wherein the input selects a plurality of contacts from a contact list.

7. The method of claim 5, wherein the received cost information comprise an image.

8. The method of claim 5, wherein the received cost information comprise a text message.

9. The method of claim 5, further comprising:
displaying one or more received cost information.

10. A computer program product comprising a non-transitory computer readable recording medium comprising instructions which, when executed, cause an electronic device to perform operations of:

receiving an input;

selecting, based on the input, a plurality of electronic devices;

identifying a group based on the plurality of electronic devices selected based on the input;

receiving cost information from each of the plurality of electronic devices, each of the cost information including a cost amount and an identification of a corresponding electronic device;

identifying a cost amount of the group based on the received cost information and the information related to the plurality of electronic devices;

calculating cost amounts to be allocated to the plurality of electronic devices, based on the cost amount of the group and the obtained information related to the plurality of electronic devices;

identifying information related to the calculated cost amounts corresponding to the plurality of electronic devices; and transmitting the identified information related to the calculated cost amounts to the plurality of electronic devices.

11. An electronic device comprising:
a communicator;
a memory storing one or more instructions; and
a processor electrically connected to the communicator and the memory,
wherein the processor is configured to execute the one or more instructions to:
obtain information related to a plurality of electronic devices from at least one of the plurality of electronic devices,
identify a group based on the obtained information related to the plurality of electronic devices,
control the communicator to receive cost information from each of the plurality of electronic device, each of the cost information including a cost amount and an identification of a corresponding electronic device,
identify a cost amount of the group based on the received cost information and the information related to the plurality of electronic devices,
calculate cost amounts to be allocated to the plurality of electronic devices based on the cost amount of the group and the obtained information related to the plurality of electronic devices,
identify information related to the calculated cost amounts corresponding to the plurality of electronic devices, and
control the communicator to transmit the identified information related to the calculated cost amount to the electronic devices.

12. The electronic device of claim 11, wherein the processor is configured to control the communicator to receive financial account information from the at least one of the plurality of electronic devices and to obtain, from a financial server, transaction history information about a financial account, based on the financial account information.

13. The electronic device of claim 11, wherein the group is identified based on a member list received from the least one of the plurality of electronic devices.

* * * * *